United States Patent
Nakamoto

(10) Patent No.: US 8,724,011 B2
(45) Date of Patent: May 13, 2014

(54) IMAGE PICKUP APPARATUS AND CONTROL METHOD THEREFOR

(75) Inventor: Miyako Nakamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 13/475,427

(22) Filed: May 18, 2012

(65) Prior Publication Data

US 2012/0300116 A1  Nov. 29, 2012

(30) Foreign Application Priority Data

May 25, 2011  (JP) ................................ 2011-116739

(51) Int. Cl.
*H04N 5/238* (2006.01)
*G03B 3/00* (2006.01)
*G03B 13/32* (2006.01)
*G03B 3/10* (2006.01)
*G06K 9/40* (2006.01)

(52) U.S. Cl.
USPC ........... 348/345; 348/349; 348/353; 348/346; 348/350; 396/104; 396/89; 396/121; 396/79; 396/82; 382/255

(58) Field of Classification Search
CPC ........ H04N 5/232; G03B 13/00; G03B 13/34; G03B 17/00; G03B 13/18; G06K 9/40
USPC ................. 348/345, 346, 348, 349, 350, 353; 396/79, 82, 89, 104, 121; 382/255
See application file for complete search history.

(56) References Cited

U.S. PATENT DOCUMENTS

| | | | | |
|---|---|---|---|---|
| 7,058,294 | B2 * | 6/2006 | Nakahara | 396/104 |
| 7,734,167 | B2 * | 6/2010 | Kiyamura et al. | 396/133 |
| 2004/0057712 | A1 * | 3/2004 | Sato et al. | 396/89 |
| 2007/0206937 | A1 * | 9/2007 | Kusaka | 396/89 |

FOREIGN PATENT DOCUMENTS

| | | |
|---|---|---|
| JP | 2000-292684 | 10/2000 |
| JP | 2007-286438 | 11/2007 |

\* cited by examiner

*Primary Examiner* — Tuan Ho
*Assistant Examiner* — Marly Camargo
(74) *Attorney, Agent, or Firm* — Cowan, Liebowitz & Latman, P.C.

(57) ABSTRACT

The image pickup apparatus includes a first detector detecting a first in-focus position by a phase difference detection method using paired image signals, a controller controlling position of a focus lens a basis of the first in-focus position to perform focusing, a second detector detecting a second in-focus position by a contrast detection method, a calculating part calculating a correction value for correcting the first in-focus position in image capturing on a basis of difference between the first and second in-focus positions, and a determining part determining a level of reliability of the first in-focus position. The controller calculates the correction value when the level of reliability is a first level, and to restrict the calculation of the correction value when the level of reliability is a second level lower than the first level.

13 Claims, 17 Drawing Sheets

IMAGE PICKUP APPARATUS AND CONTROL METHOD THEREFOR

BACKGROUND OF THE INVENTION

1. Field of the Invention

The present invention relates to an image pickup apparatus capable of performing focus control by a phase difference detection method, and particularly to an image pickup apparatus having a focus calibration function of correcting an in-focus position acquired by the phase difference detection method, based on an in-focus position acquired by a contrast detection method.

2. Description of the Related Art

In cameras and interchangeable lenses providing an in-focus state through focus control (that is, autofocus (AF)) by the phase difference detection method, increase of a number of times of use thereof may generate backlash in mechanisms and members relating to the AF, which may result in deterioration of their in-focus accuracy. For example, in the interchangeable lens, a focus lens may be incorrectly moved to a calculated in-focus position due to such backlash generated in the mechanism for moving the focus lens. Moreover, in the camera, increase of a number of times of driving its mirror that reflects light from an interchangeable lens toward an AF sensor for detecting phase differences in the phase difference detection method changes an angle of the mirror, which may result in change in light entering position on the AF sensor and thereby may cause difference of an in-focus position calculated based on output of the AF sensor from a correct in-focus position. Such difference of the calculated in-focus position causes the focus lens to a position different from the correct in-focus position, which deteriorates the in-focus accuracy.

Correction of the deteriorated in-focus accuracy to original good accuracy requires a user to bring the camera or the interchangeable lens to a service center in order to request readjustment of the in-focus position, or requires the user to use functions of image pickup apparatuses disclosed in Japanese Patent Laid-Open Nos. 2000-292684 and 2007-286438.

The image pickup apparatus disclosed in Japanese Patent Laid-Open No. 2000-292684 acquires, in a test mode, data relating to its focus state respectively from an AF sensor for detecting phase differences and from an image sensor (image pickup element) provided for producing captured images, and stores a relative shift amount (difference) between these data. Then, the image pickup apparatus moves, in an image capturing mode, a focus lens based on the stored relative shift amount.

Moreover, the image pickup apparatus disclosed in Japanese Patent Laid-Open No. 2007-286438 has a focus calibration mode in which the apparatus determines, based on difference between an in-focus position acquired by the phase difference detection method and an in-focus position acquired by the contrast detection method, a level of reliability of these in-focus positions. Then, when the level of reliability is low, the apparatus outputs warning or does not use the difference as a correction value for focus calibration.

However, the image pickup apparatus disclosed in Japanese Patent Laid-Open No. 2000-292684 acquires the data relating to the focus state and calculates the relative shift amount thereof, without using information on an object to be captured. Therefore, the apparatus may acquire no data or may calculate an erroneous relative shift amount, depending on type of the object. Acquiring accurate data on the focus state requires provision of a special measurement and adjustment environment like in the service center.

Furthermore, the image pickup apparatus disclosed in Japanese Patent Laid-Open No. 2007-286438 acquires information on the level of reliability from the difference between the in-focus position calculated by the phase difference detection method and the in-focus position detected by the contrast detection method. Thus, the apparatus may output no warning or may use the correction value for the focus calibration, even when a level of reliability itself of the in-focus position calculated by the phase difference detection is low.

SUMMARY OF THE INVENTION

The present invention provides an image pickup apparatus and a control method therefor enabling focus calibration with a high level of reliability without the provision of the special measurement and adjustment environment.

The present invention provides as an aspect thereof an image pickup apparatus including an image capturing part configured to photoelectrically convert an object image formed by an image pickup optical system to produce an image pickup signal, a first detector configured to detect a first in-focus position by a phase difference detection method using paired image signals produced by photoelectric conversion of the object image, a controller configured to control position of a focus lens included in the image pickup optical system on a basis of the first in-focus position to perform focusing, a second detector configured to detect a second in-focus position by a contrast detection method using the image pickup signal, a calculating part configured to calculate a correction value for correcting the first in-focus position in image capturing on a basis of difference between the first in-focus position and the second in-focus position, and a determining part configured to determine a level of reliability of the first in-focus position, using information on the paired image signals. The controller is configured to calculate the correction value when the level of reliability is a first level, and to restrict the calculation of the correction value when the level of reliability is a second level lower than the first level.

The present invention provides as another aspect thereof a method of controlling an image pickup apparatus configured to electrically convert an object image formed by an image pickup optical system to produce an image pickup signal. The method including a step of detecting a first in-focus position by a phase difference detection method using paired image signals produced by photoelectric conversion of the object image, a step of controlling position of a focus lens included in the image pickup optical system on a basis of the first in-focus position to perform focusing, a step of detecting a second in-focus position by a contrast detection method using the image pickup signal, a calculation step of calculating a correction value for correcting the first in-focus position in image capturing on a basis of difference between the first in-focus position and the second in-focus position, and a step of determining a level of reliability of the first in-focus position, using information on the paired image signals. In the calculation step, the method calculates the correction value when the level of reliability is a first level, and restricts the calculation of the correction value when the level of reliability is a second level lower than the first level.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Embodiment 1

Figure 17:
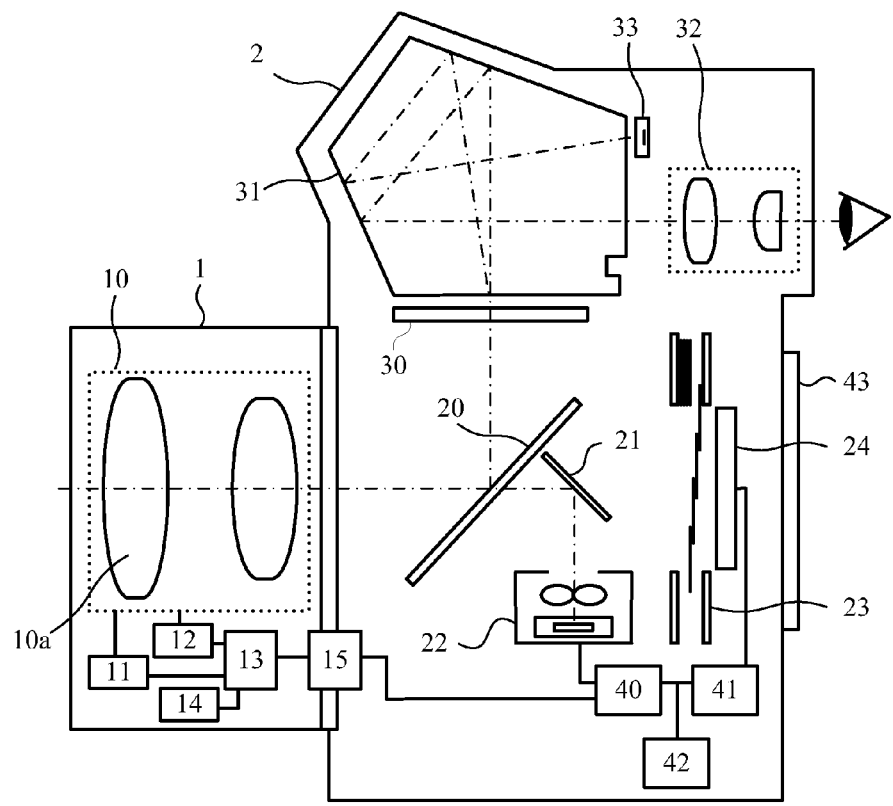
FIG. 17 shows a configuration of the camera of Embodiment 1.

FIG. 17 shows a configuration of a camera system constituted by a digital single-lens reflex camera 2 that is a first embodiment (Embodiment 1) of the present invention and an interchangeable lens 1 that is interchangeable to the camera 2. This camera system performs an AF process by a phase difference detection method (hereinafter referred to as "phase difference AF"), and has a focus calibration function (or a focus correction function) that is a function of correcting the phase difference AF by using a focus detection result by a contrast detection method.

The interchangeable lens 1 houses thereinside an image pickup optical system 10 constituted by plural lens units and an aperture stop. Of the plural lens units, a magnification-varying lens unit (not shown and hereinafter referred to as a zoom lens) is moved in an optical axis direction to change a focal length of the image pickup optical system 10, thereby performing variation of magnification (zooming). Moreover, of the plural lens units, a focus lens unit (hereinafter simply referred to as "a focus lens") 10a is moved in the optical axis direction to perform focusing.

A lens driver 11 includes actuators for moving the zoom lens and the focus lens 10a, driving circuits for the actuators and transmission mechanisms (driving mechanisms) respectively transmitting driving force from the actuators to the zoom lens and the focus lens 10a. A lens status detector 12 detects positions of the zoom lens and the focus lens 10a, that is, a zoom position and a focus position.

A lens controller 13 is constituted by a CPU or the like, and controls operations of the interchangeable lens 1 in response to commands from a camera controller 40 described later. The lens controller 13 is capable of communicating with the camera controller 40 through communication terminals among electric contacts 15. The interchangeable lens 1 is supplied with electric power from the camera 2 through a power supply terminal among the electric contacts 15. A lens memory 14 is constituted by a ROM or the like, and stores various information such as data to be used in control operations performed by the lens controller 13, identification information of the interchangeable lens 1 and optical information of the image pickup optical system 10.

In the camera 2, a main mirror 20 constituted by a half mirror is disposed, in an optical viewfinder observation state of allowing a user to observe an object through a viewfinder optical system, at a down position in an image pickup optical path to reflect part of light from the image pickup optical system 10 toward a focusing plate 30. On the other hand, in a live view observation state of displaying an electric viewfinder image (live view image) on a back-face monitor 43 and in an image capturing state of producing a recording image (still image or video), the main mirror 20 is rotated to an up position to retract from the image pickup optical path. The retraction of the main mirror 20 allows the light from the image pickup optical system 10 to travel toward a shutter 23 and an image sensor 24.

A sub mirror 21 is rotated together with the main mirror 20 and introduces the light transmitted through the main mirror 20 disposed at the down position to an AF sensor 22. The sub mirror 21 is retracted from the image pickup optical path together with the main mirror 20 rotated to the up position.

The AF sensor (first detector) 22 receives light from the object which has passed through the image pickup optical system 10 and then has been reflected at the sub mirror 21 to detect, by the phase difference detection method, a focus state of the image pickup optical system 10 in each of plural focus detection areas provided in an image capturing area of the camera 2. The detection of the focus state is hereinafter referred to as "focus detection". The AF sensor 22 includes a secondary image-forming lens (not shown) causing light from each focus detection area in the image capturing area to form paired optical images (paired object images), and an area sensor constituted by a CCD sensor or a CMOS sensor in which paired light-receiving element rows that respectively perform photoelectric conversion of the paired object images are provided.

The paired light-receiving element rows (sensor pair) in the area sensor output paired image signals that are photoelectric conversion signals showing luminance distributions of the paired object images to the camera controller 40. The area sensor is provided with plural paired light-receiving element rows (plural sensor pairs) two-dimensionally arranged so as to respectively correspond to the plural focus detection areas.

The camera controller 40 calculates a phase difference of the paired image signals, and then calculates the focus state (defocus amount) of the image pickup optical system 10 from the phase difference. In addition, the camera controller 40 calculates, based on the detected focus state of the image pickup optical system 10, an in-focus position (first in-focus position) to which the focus lens 10a is to be moved for acquiring an in-focus state of the image pickup optical system 10. The in-focus position thus acquired by the phase difference detection method is hereinafter referred to as "a phase difference in-focus position".

Then, the camera controller 40 sends a focus command to the lens controller 13 in order to cause the lens controller 13 to move the focus lens 10a to the calculated phase difference in-focus position. The lens controller 13 moves the focus lens 10a to the phase difference in-focus position in response to the received focus command through the lens driver 11. A focus operation is thus performed, and thereby an in-focus state of the image pickup optical system 10 is acquired.

The phase difference AF is thus performed which includes the focus detection by the phase difference detection method, the calculation of the phase difference in-focus position on the basis of the detected focus state, and the movement of the focus lens 10a to the phase difference in-focus position. The camera controller 40 serves as a focus controller.

The two-dimensional arrangement of the light-receiving element rows in the area sensor of the AF sensor 22 enables the focus detection by using horizontal and vertical luminance distributions of the object in a same view field region (for example, a central region) of the image capturing area, which will be described in detail later.

The shutter 23 is closed in the optical viewfinder observation state, and is opened in the live-view observation state and the video capturing state to allow the image sensor 24 to photoelectrically convert an object image formed by the image pickup optical system 10 (that is, to allow production of the live view image and the captured video). In addition, the shutter 23 is opened and closed at a set shutter speed in the still image capturing state to control exposure of the image sensor 24.

The image sensor 24 is constituted by an image pickup element such as a CCD sensor or a CMOS sensor, and a peripheral circuit thereof. The image sensor 24 photoelectrically converts the object image formed by the image pickup optical system 10 to output an analog image pickup signal.

The focusing plate 30 is disposed at a primary image-forming plane of the image pickup optical system 10, the primary image-forming plane being located at an equivalent position to that of the image sensor 24. In the optical viewfinder observation state, an object image as an optical viewfinder image is formed on the focusing plate 30. A penta prism 31 converts the object image formed on the focusing plate 30 into an erected normal image. An eyepiece lens 32 allows the user to observe the erected normal image. The focusing plate 30, the penta prism 31 and the eyepiece lens 32 constitute an optical viewfinder.

An AE sensor 33 for photometry receives light from the focusing plate 30 through the penta prism 31 to measure luminance of the object image formed on the focusing plate 30. The AE sensor 33 includes plural photodiodes, and thereby is capable of measuring the luminance in each of photometry areas provided so as to divide the image capturing area.

The camera controller 40 is constituted by a microcomputer including an MPU and the like, and controls operations of the entire camera system. The camera controller 40 serves as the focus controller as described above, and also serves as a correcting part and a determining part as described later.

A digital controller 41 converts the analog image pickup signal from the image sensor 24 into a digital image pickup signal and further performs various processes on the digital image pickup signal to produce a video signal (image data). The image sensor and the digital controller 41 constitute an image capturing part.

Moreover, the digital controller 41 as a second detector extracts a specific frequency component from the video signal to produce a contrast evaluation value showing contrast of the video signal, and detects an in-focus position of the focus lens 10a at which the contrast evaluation value becomes maximum. Such an operation detecting the in-focus position by the contrast detection method (the operation including focusing in the live view observation state and the video capturing state) is hereinafter referred to as "contrast AF", and an in-focus position (second in-focus position) detected by the contrast detection method is referred to as "a contrast in-focus position".

A camera memory 42 stores various data toe be used in the operations of the camera controller 40 and digital controller 41. The camera memory 42 stores the produced recording images.

The back-face monitor 43 is constituted by a display element such as a liquid crystal panel, and displays the live view image, the recording image and various information.

Although not shown in FIG. 17, the camera 2 is provided with a release switch 44. A half-press operation of the release switch 44 turns a first switch (SW1) (not shown) on, which starts the AF and the photometry. A full-press operation of the release switch 44 turns a second switch (SW2) (not shown) on, which starts the image capturing (production of the recording image).

Figure 18:
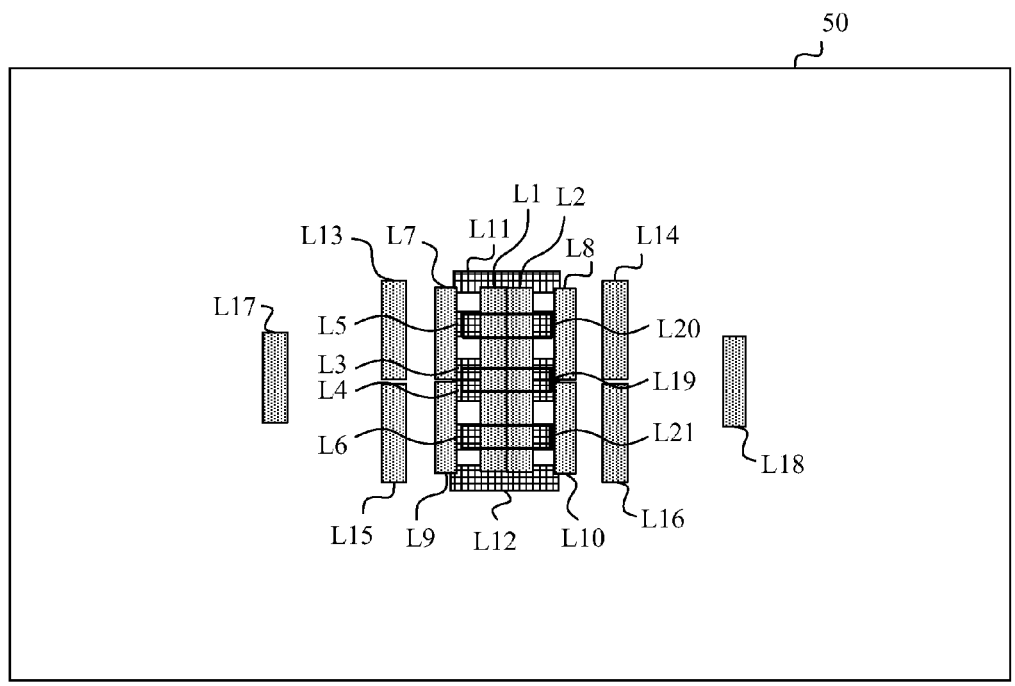
FIG. 18 shows a layout of focus detection areas (lines) in the camera of Embodiment 1.

FIG. 18 shows a layout of the focus detection areas in the image capturing area 50 of the camera 2. The image capturing area 50 includes twenty one focus detection areas each being formed like a line (hereinafter referred to as "a focus detection line"). In the central region of the image capturing area 50, two vertically extended focus detection lines (hereinafter referred to as "vertical focus detection lines") L1 and L2 are arranged, and two horizontally extended focus detection lines (hereinafter referred to as "horizontal focus detection lines") L3 and L4 are arranged. For one focus detection line, one pair of the light-receiving element rows as the sensor pair is provided.

The vertical focus detection line provides a vertical correlation direction (that is, a correlation direction in which short sides of the image sensor 24 are extended). The vertical focus detection line detects the focus state of the image pickup optical system 10 from the luminance distribution in the vertical direction. On the other hand, the horizontal focus detection line provides a horizontal correlation direction (that is, a correlation direction in which long sides of the image sensor 24 are extended). The horizontal focus detection line detects the focus state of the image pickup optical system 10 from the luminance distribution in the horizontal direction.

The two vertical focus detection lines L1 and L2 are shifted to each other in the vertical direction by a minute shift amount. This shift amount corresponds to half of a pitch of pixels arranged in the vertical correlation direction. Calculating a detection result with consideration of the focus detection results acquired from the vertical focus detection lines L1 and L2 shifted to each other by the half of the vertical pixel pitch reduces variation in the detection result (hereinafter referred to as "detection variation"). As for the two horizontal focus detection lines L3 and L4, as well as the vertical focus detection lines L1 and L2, calculating a detection result with consideration of the focus detection results acquired from the horizontal focus detection lines L3 and L3 shifted to each other by half of a pitch of pixels arranged in the horizontal correlation direction reduces detection variation.

In the central region of the image capturing area 50, a horizontal focus detection line L19 is provided whose base length is long and which performs the focus detection by using a light flux of F2.8. Since the base length of the horizontal focus detection line L19 is longer than those of the horizontal focus detection lines L3 and L4, the paired object images formed on the horizontal focus detection line L19 are moved on a light-receiving surface of the AF sensor 22 more largely than the paired object images formed on the horizontal focus detection lines L3 and L4, which realizes more accurate detection than the horizontal focus detection lines L3 and L4.

However, the horizontal focus detection line L19 using the light flux of F2.8 is effective only when an interchangeable lens having a brightness of F2.8 or more is attached to the camera 2. Moreover, the large movement of the paired object images formed on the horizontal focus detection line L19 deteriorates an ability of detection of large defocus as compared with the horizontal focus detection lines L3 and L4. Providing such a horizontal focus detection line L19 using the light flux of F2.8 makes it possible to achieve, when the bright interchangeable lens having a brightness of F2.8 or more is attached which requires high detection accuracy, detection with high accuracy corresponding to the requirement. Such a focus detection line using the light flux of F2.8 is hereinafter referred to as "an F2.8 focus detection line".

In the central region of the image capturing area 50, arranging the vertical and horizontal focus detection lines in a cross manner enables detection of the luminance distributions in both the vertical and horizontal directions. Detecting both the vertical and horizontal luminance distributions avoids necessity of forcibly performing the focus detection on an object having little luminance distribution, which enables reduction of the detection variation. This makes it possible to expand types of objects enabling the focus detection and to improve accuracy of the focus detection. As described above, in the central region of the image capturing area 50, three focus detection results are provided by the vertical focus detection line (L1 and L2), the horizontal detection line (L3 and L4) and the horizontal F2.8 focus detection line (L19).

Next, description will be made of focus detection lines arranged in upper and lower regions in the image capturing area 50. In the upper region of the image capturing area 50, horizontal focus detection lines L5 and L11 are arranged, each of which detects the focus state of the image pickup optical system 10 from a horizontal luminance distribution of an object image located in the upper region of the image capturing area 50. In the lower region of the image capturing area 50, horizontal focus detection lines L6 and L12 are arranged, each of which detects the focus state of the image pickup optical system 10 from a horizontal luminance distribution of an object image located in the lower region of the image capturing area 50. Moreover, a horizontal F2.8 focus detection line L20 is disposed at a same position as that of the horizontal focus detection line L5, and a horizontal F2.8 focus detection line L21 is disposed at a same position as that of the horizontal focus detection line L6. These horizontal F2.8 focus detection lines L20 and L21 enable, when a bright interchangeable lens having a brightness of F2.8 or more is attached which requires high detection accuracy, the focus detection with high accuracy.

Moreover, vertical focus detection lines L7 and L9 are vertically arranged so as to be adjacent to left ends of the focus detection lines L3, L4, L5, L6, L11 and L12, and vertical focus detection lines L8 and L10 are vertically arranged as to be adjacent to right ends of the focus detection lines L3, L4, L5, L6, L11 and L12. Each of the vertical focus detection lines L7, L8, L9 and L10 detects the focus state of the image pickup optical system 10 from a vertical luminance distribution of an object image.

Furthermore, vertical focus detection lines L13 and L15 are vertically arranged on a further left side than the vertical focus detection lines L7 and L9, and vertical focus detection lines L14 and L16 are vertically arranged on a further right side than the vertical focus detection lines L8 and L10. Each of the vertical focus detection lines L13, L14, L15 and L16 also detects the focus state of the image pickup optical system 10 from a vertical luminance distribution of an object image.

Vertical focus detection lines L17 and L18 are arranged in outermost regions in the horizontal direction. Each of the vertical focus detection lines L17 and L18 has its vertical center located at a same vertical position of a center of the image capturing area 50 (that is, at a same position of an optical axis of the image pickup optical system 10), and detects the focus state of the image pickup optical system 10 from a vertical luminance distribution of an object image located in the horizontal direction.

Next, description will be made of a focus calibration function (hereinafter referred to as "AF calibration") of the camera 2. The AF calibration is a function of correcting the phase difference in-focus position acquired by the phase difference detection method based on difference between the phase difference in-focus position and the contrast in-focus position acquired by the contrast AF. The AF calibration is mainly performed by the camera controller 40 serving as a calibrating part; the camera controller 40 calculates the phase difference in-focus position from the phase difference of the paired image signals input from the AF sensor 22, and acquire the contrast in-focus position from the digital controller 41.

Moreover, the camera controller 40 serving as a reliability level determining part calculates, by using information on the paired image signals from the AF sensor 22, a level of reliability of the phase difference AF for an object targeted by the phase difference AF, and then determines whether the calculated level of reliability is high or low. The level of reliability of the phase difference AF for the object in this embodiment is, basically, a level of reliability of the defocus amount (focus state) that is acquired by using the paired image signals from the AF sensor 22 receiving the light from the object. However, since the phase difference in-focus position is calculated from the defocus amount, the level of reliability of the phase difference AF can be also said as a level of reliability of the phase difference in-focus position. In the following description, the level of reliability of the phase difference AF for the object is also simply referred to as "AF reliability level".

And, this embodiment uses, as an evaluation value showing the AF reliability level and calculated by the information on the paired image signals, an S-level (Select level) value SL disclosed in Japanese Patent Laid-Open No. 2007-052072.

The camera controller 40 performs the AF calibration when the S-level value SL is equal to or lower than a threshold (or when the S-level value SL is lower than the threshold), that is, when the AF reliability level is a first level showing a high reliability level. On the other hand, when the S-level value SL is higher than the threshold (or when the S-level value SL is equal to or higher than the threshold), that is, when the AF reliability level is a second level showing a low reliability level, the camera controller 40 restricts the AF calibration and performs an operation (or process) not performed when the AF reliability level is the first level.

The S-level value SL is expressed by the following expression where U represents a degree of coincidence of the paired image signals (hereinafter simply referred to as "a coincidence degree), ΔV represents a number of edges (hereinafter referred to as "a correlation change amount"), SH represents sharpness and PBD represents a light and dark ratio, which are parameters included in the information on the paired image signals.

$$SL = \frac{U}{\Delta V \times SH \times PBD}$$

The information on the paired image signals does not necessarily need to be information on both the paired image signals, that is, may be information on any one of the paired image signals. The coincidence degree U, the correlation change amount ΔV, the sharpness SH and the light and dark ratio PBD may be also said as information obtainable from the paired image signals.

As the coincidence degree U becomes lower, the AF reliability level becomes higher. As the correlation change amount ΔV becomes larger, the AF reliability level becomes higher. As the sharpness SH becomes higher, the AF reliability level becomes higher. The light and dark ratio PBD becomes higher, the AF reliability level becomes higher. Therefore, the S-level value SL is defined as above by using the coincidence degree U as the numerator and using a product of the correlation change amount ΔV, the sharpness SH and the light and dark ratio PBD as the denominator, such that the S-level value SL becomes smaller as each of the parameters shows a higher AF reliability level.

Description of the coincidence degree U will be made. The photoelectric conversion of the paired object images by the area sensor of the AF sensor 22 provides the paired image signals. These paired image signals are hereinafter respectively referred to as "an A image" and "a B image". Description here will be made of a case where the A and B images have different shapes because unnecessary light such as ghost light enters any one of the A and B images. Since the A and B images have such different shapes, one of the A and B images includes a portion (hereinafter referred to as "a non-coincident portion") that is not coincident with a corresponding portion of the other even in an in-focus state. This embodiment defines an area of such a non-coincident portion as the coincidence degree.

When N represents the number of the light-receiving element rows (pixel rows) in the area sensor, and a[i] and b[i] represent outputs (pixel outputs) of i-th pixels of the A and B images in an in-focus state, the coincidence degree U is expressed by the following expression (1):

$$U = \sum_{i=1}^{N} |a[i] - b[i]| \qquad (1)$$

Defining an absolute sum of differences of the pixel outputs between the A and B images as the coincidence degree U enables accurate expression of the degree of coincidence between the A and B images. A low degree of coincidence between the A and B images makes the coincidence degree U high, and a high degree of coincidence between the A and B images makes the coincidence degree U low.

Next, description of the correlation change amount ΔV will be made. This embodiment uses, as a parameter showing the number of edges, the correlation change amount calculated by correlation calculation. Shifting the A and B images respectively by one pixel from the A and B images in an in-focus state changes a correlation amount of the A and B images. A change amount of the correlation amount after the shifting of the A and B images from that before the shifting (that is, in the in-focus state) corresponds to the correlation change amount. The correlation change amount ΔV is expressed by the following expressions (2), (3) and (4) where V1 represents the correlation amount of the A and B images in the in-focus state and V2 represents the correlation amount of the A and B images after the shifting by one pixel from the in-focus state.

$$V1 = \sum_{i=1}^{N} \text{MAX}(a[i], b[i]) \qquad (2)$$

$$V2 = \sum_{i=1}^{N-1} \text{MAX}(a[i], b[i+1]) \qquad (3)$$

$$\Delta V = V2 - V1 \qquad (4)$$
$$= \sum_{i=1}^{N-1} \text{MAX}(a[i], b[i+1]) - \sum_{i=1}^{N} \text{MAX}(a[i], b[i])$$

The correlation change amount ΔV corresponds to an area of the non-coincident portion generated by change from a state where edges of the A and B images are coincident with each other to a state where the edges of the A and B images are shifted from each other, the change being caused by the shifting by one pixel from the in-focus state. Thus, increase of the number of the edges increases the area of the non-coincident portion generated due to the shifting. As understood therefrom, the correlation change amount ΔV is a proper parameter to show the number of the edges. The shift amount may be two or more pixels.

Next, description the sharpness SH will be made. The sharpness in this embodiment shows whether a signal value of each of the A and B images steeply changes or gradually changes from a certain bottom value to a certain peak value. This embodiment defines the sharpness as a ratio of a primary contrast evaluation value C1 and a secondary contrast evaluation value C2, each of the primary and secondary contrast evaluation values being acquired from the A and B images.

The primary contrast evaluation value C1 is a sum of absolute values of differences between outputs from adjacent pixels plurally included in each of the A and B images. The secondary contrast evaluation value C2 is a square sum of differences between the outputs from the adjacent pixels plurally included in each of the A and B images. The primary contrast evaluation value C1 and the secondary contrast evaluation value C2 are expressed by the following expressions where N represents a number of the pixel rows in the AF sensor 22, a[i] and b[i] respectively represent the outputs of the i-th pixels in the A and B images in the in-focus state as mentioned above. MAX represents the larger one of two elements in curly brackets.

$$C1 = \text{MAX}\left\{ \sum_{i=1}^{N-1} |a[i+1] - a[i]|, \sum_{i=1}^{N-1} |b[i+1] - b[i]| \right\} \qquad (5)$$

$$C2 = \text{MAX}\left\{\sum_{i=1}^{N-1}(a[i+1]-a[i])^2, \sum_{i=1}^{N-1}(b[i+1]-b[i])^2\right\} \quad (6)$$

Since the primary contrast evaluation value C1 is the sum of the absolute values of the differences between the outputs from the adjacent pixels, a primary contrast evaluation value C1 that is obtained from an edge portion of a signal waveform does not change as long as peak and bottom values of the edge portion do not change, regardless whether tone change of the edge portion is steep or gradual. For example, a primary contrast evaluation value C1 obtained from an object having a white half part and a black half part which are in contact with each other at their boundary is equal to a primary contrast evaluation value C1 obtained from an object having a white end, a black end and color gradated from the white end to the black end.

On the other hand, since the secondary contrast evaluation value C2 is the square sum of the differences between the outputs from the adjacent pixels, a secondary contrast evaluation value C2 obtained from an edge portion whose tone steeply changes becomes larger than that obtained from an edge portion whose tone gradually changes, which is elucidated from the expression (6). Thus, it is proper to estimate, by using the secondary contrast evaluation value C2, whether the tone change of the edge portion is steep or gradual.

When representing sharpness of the object image by SH, the sharpness SH is expressed by the following expression as a ratio of the primary contrast evaluation value C1 and the secondary contrast evaluation value C2.

$$SH = \frac{C2}{C1} \quad (7)$$

$$= \frac{\text{MAX}\left\{\sum_{i=1}^{N-1}(a[i+1]-a[i])^2, \sum_{i=1}^{N-1}(b[i+1]-b[i])^2\right\}}{\text{MAX}\left\{\sum_{i=1}^{N-1}|a[i+1]-a[i]|, \sum_{i=1}^{N-1}|b[i+1]-b[i]|\right\}}$$

The reason of expressing the sharpness SH, not by the secondary contrast evaluation value C2, but by the above-mentioned value obtained by dividing the secondary contrast evaluation value C2 by the primary contrast evaluation value C1 is to exclude influence of the number of edges. An example will be described which represents a secondary contrast evaluation value obtained from the object having the white half part and the black half part which are in contact with each other at their boundary by C2_1, and represents a secondary contrast evaluation value obtained from an object having black ends and a white central part which are in contact with one another at their two boundaries by C2_2.

Since the sharpness shows, as described above, whether the signal value of each of the A and B images steeply changes or gradually changes from the bottom value to the peak value, the sharpness should not change regardless whether the number of edges is one or two. The secondary contrast evaluation values C2_1 and C2_2 have the following relationship:

$$C2\_2 = (C2\_1) \times 2 \quad (8)$$

As shown by the expression (8), as the number of edges increases, the secondary contrast evaluation value C2 increases by a value corresponding to the increased number. Therefore, it is improper to express the sharpness only by the secondary contrast evaluation value C2. Thus, in order to exclude the influence of the number of edges, this embodiment normalizes the sharpness by dividing the secondary contrast evaluation value C2 by the primary contrast evaluation value C1.

An example will be described which represents a primary contrast evaluation value obtained from the object having the white half part and the black half part which are in contact with each other at their boundary by C1_1, and represents a primary contrast evaluation value obtained from the object having the black ends and the white central part which are in contact with one another at their two boundaries by C1_2. The primary contrast evaluation values C1_1 and C1_2 have the following relationship:

$$C1\_2 = (C1\_1) \times 2 \quad (9)$$

Furthermore, an example will be described which represents a sharpness obtained from the object having the white half part and the black half part which are in contact with each other at their boundary by SH_1, and represents a sharpness obtained from the object having the black ends and the white central part which are in contact with one another at their two boundaries by SH_2. The sharpness SH_1 and the sharpness SH_2 are expressed as follows:

$$SH\_1 = \frac{(C2\_1)}{(C1\_1)} \quad (10)$$

$$SH\_2 = \frac{(C2\_2)}{(C1\_2)} \quad (11)$$

Substituting the expressions (8) and (9) to the expression (11) provides the following sharpness SH_2:

$$SH\_2 = \frac{(C2\_1) \times 2}{(C1\_1) \times 2} \quad (12)$$
$$= \frac{(C2\_1)}{(C1\_1)}$$
$$= SH\_1$$

As understood from the expression (12), the sharpness SH_1 obtained from the object having the white half part and the black half part which are in contact with each other at their boundary is equal to the sharpness SH_2 obtained from the object having the black ends and the white central part which are in contact with one another at their two boundaries. As well as this example, regardless of increase of the number of edges, the sharpness SH does not change.

As described above, defining the ratio of the primary contrast evaluation value and the secondary contrast evaluation value as the sharpness makes it possible to accurately express the sharpness of the object image.

Next, description of the light and dark ratio PBD will be made. The light and dark ratio PBD is a parameter showing whether or not shading of the object image is clear. Specifically, the light and dark ratio PBD shows a ratio of a height from a bottom value to a peak value of the object image (image signal) with respect to a height from a dark value to the peak value as outputs from the AF sensor 22 (hereinafter referred to as "sensor output").

A light and dark ratio PBD_A obtained from the A image is expressed by the following expression (13) where DARK_A, BOTTOM_A and PEAK_A respectively represent a dark value, a bottom value and a peak value of the A image in an in-focus state. Similarly, a light and dark ratio PBD_B obtained from the B image is expressed by the following expression (14) where DARK_B, BOTTOM_B and PEAK_B respectively represent a dark value, a bottom value and a peak value of the B image in the in-focus state.

$$PBD\_A = \frac{PEAK\_A - BOTTOM\_A}{PEAK\_A - DARK\_A} \quad (13)$$

$$PBD\_B = \frac{PEAK\_B - BOTTOM\_B}{PEAK\_B - DARK\_B} \quad (14)$$

This embodiment defines the larger one of the light and dark ratios PBD_A and PBD_B thus obtained from the A and B images as the light and dark ratio PBD, as shown by the following expression:

$$PBD = MAX(PBD\_A, PBD\_B) \quad (15)$$

$$= MAX \begin{pmatrix} \frac{PEAK\_A - BOTTOM\_A}{PEAK\_A - DARK\_A}, \\ \frac{PEAK\_B - BOTTOM\_B}{PEAK\_B - DARK\_B} \end{pmatrix}$$

The light and dark ratio PBD shown by the expression (15) can express a size of the height from the bottom value to the peak value of the object image with respect to the height from the dark value to the peak value of the sensor output. As understood from the expression (15), the light and dark ratio PBD is a value within a range from 0 to 1

A light and dark ratio PBD close to 1 means that the height from the bottom value to the peak value of the object image is approximately same as the height from the dark value to the peak value of the sensor output. In this case, this embodiment determines that the object has clear shading. In contrast thereto, a light and dark ratio PBD close to 0 means that the height from the bottom value to the peak value is very smaller than the height from the dark value to the peak value. In this case, this embodiment determines that the object has unclear shading.

As described above, using the light and dark ratio PBD calculated based on the dark value, the bottom value and the peak value makes it possible to accurately determine whether or not the object image has clear shading.

This embodiment uses a general object for the AF calibration. And, this embodiment uses the above-described S-level value SL as the evaluation value of the AF reliability level, which enables reduction of object dependency of the phase difference AF. In other words, determination that the AF reliability level is high (that is, the first level) based on the S-level value SL secures that the phase difference AF achieves an in-focus state for the object with high accuracy. Therefore, this embodiment performs the AF calibration (that is, calculates the correction value) to correct the phase difference in-focus position, thereby acquiring a highly accurate in-focus state.

On the other hand, determination that the AF reliability level is low (that is, the second level) based on the S-level value SL means that the object is likely to make it impossible to acquire a good in-focus state by the phase difference AF. Thus, this embodiment restricts the AF calibration to avoid erroneous correction of the phase difference in-focus position by the AF calibration. When restricting the AF calibration, this embodiment performs the operation (or process) that is not performed when the AF reliability level is the first level; the operation includes displaying of a warning, producing no correction value for correcting the phase difference in-focus position and forced reperforming of the AF calibration.

Although this embodiment describes the case of determining the AF reliability level by using the S-level value SL, the AF reliability level may be determined by singly using the above-described coincidence degree U, correlation change amount ΔV, sharpness SH and light and dark ratio PBD. Moreover, the AF reliability level may be determined by using the defocus amount as the information on the paired image signals (information obtainable from the paired image signals). Furthermore, as described in a second embodiment later, the AF reliability level may be determined by using information on a charge accumulation time in the AF sensor 22 as the information on the paired image signals.

Figure 1:
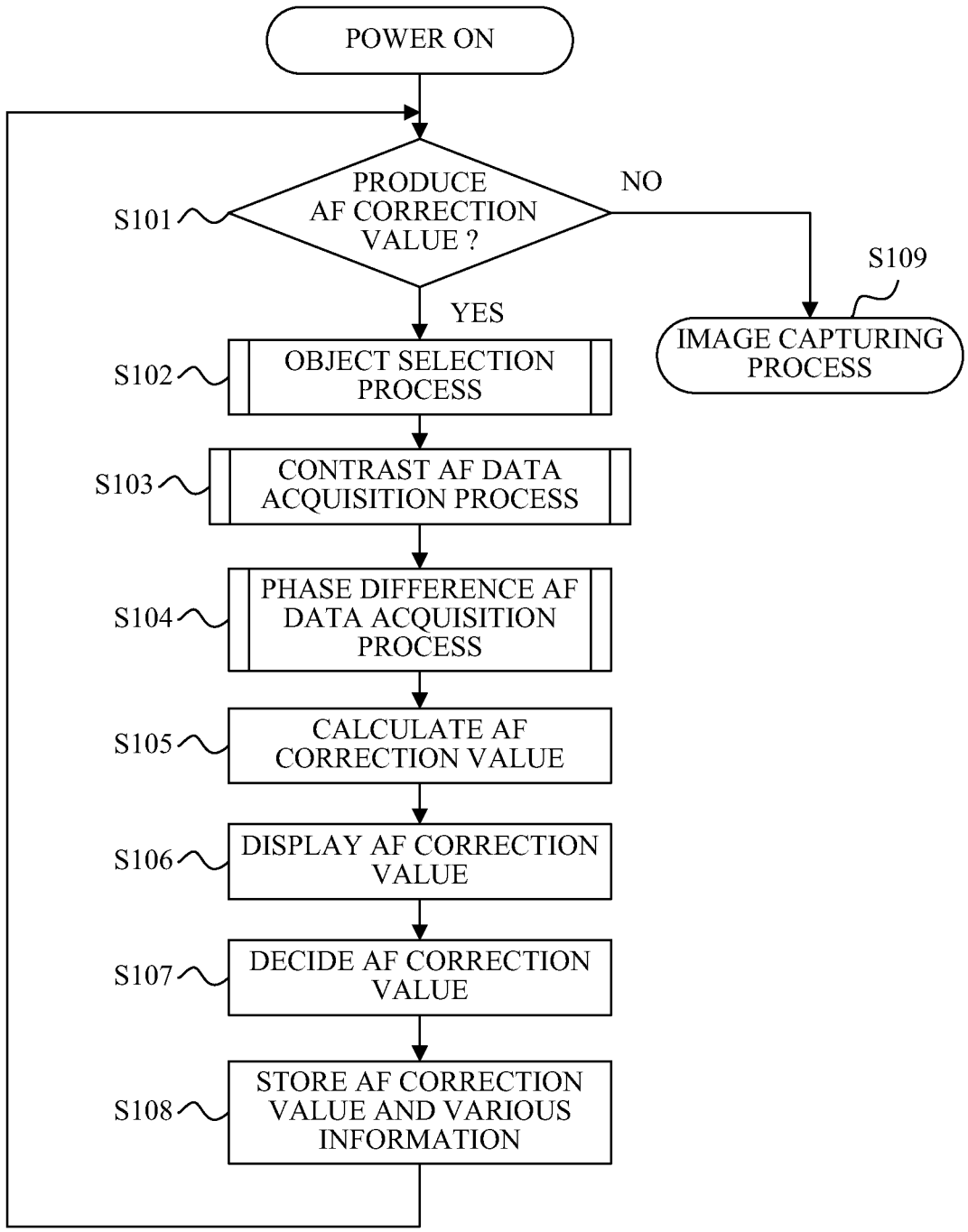
FIG. 1 is a flowchart showing an AF calibration process of a camera that is Embodiment 1 of this invention.

FIG. 1 is a flowchart showing processes for the AF calibration mainly performed by the camera controller 40. The camera controller 40 executes these processes and other processes described later according to computer programs.

At step S101, the camera controller 40 determines whether or not to produce, by the AF calibration, the correction value (hereinafter referred to as "an AF correction value") for correcting the phase difference in-focus position. The camera controller 40 proceeds to step S102 if producing the AF correction value, and the camera controller 40 proceeds to step S109 to enter an image capturing process (image capturing flow) if not producing the AF correction value. Detail of the image capturing process will be described later.

At step S102, the camera controller 40 performs an object selection process. Detail of the object selection process will be described later.

Next, at step S103, the camera controller 40 performs a contrast AF data acquisition process.

Detail of the contrast AF data acquisition process will be described later.

Next, at step S104, the camera controller 40 performs a phase difference AF data acquisition process. Detail of the phase difference AF data acquisition process will be described later.

Furthermore, at step S105, the camera controller 40 calculates the AF correction value from a defocus amount C-DEF at a current focus lens position, which is calculated at step S104 by using a contrast in-focus position C, and from a mean value μDEF of defocus amounts DEF calculated at step S104. Detail of the contrast defocus amount C-DEF and the mean value μDEF of the defocus amounts DEF will be described later.

Next, at step S106, the camera controller 40 displays, on the back-face monitor 43, the AF correction value calculated at step 105 as a recommended AF correction value to be recommended to a user.

Next, at step S107, the camera controller 40 decides, in response to a user's selection operation, the AF correction value displayed at step S106 as a use AF correction value.

Then, at step S108, the camera controller 40 associates the use AF correction value decided at step S107 with various information to be added thereto, and stores them to a camera memory 42 shown in FIG. 17. The various information includes information showing an individual of the interchangeable lens (such as an identification number or a production number) and date and place of the AF calibration. After storing the use AF correction value, the camera controller 40 returns to step S101.

Figure 3:
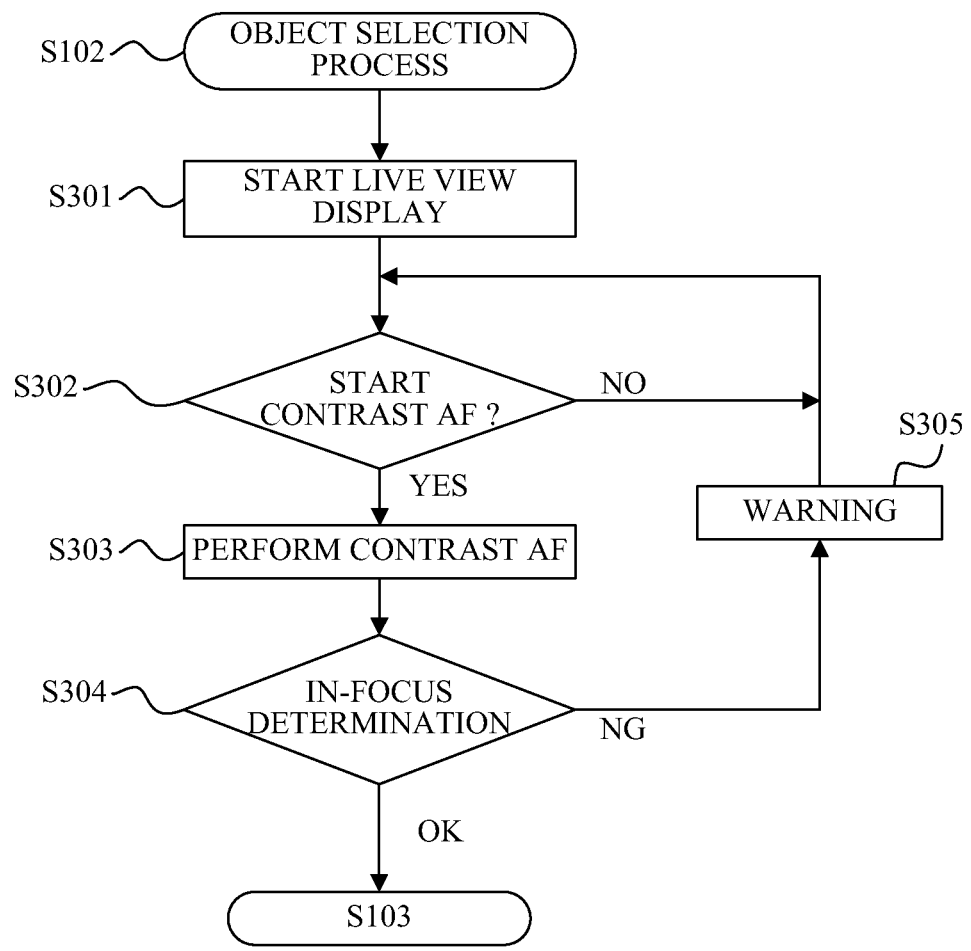
FIG. 3 is a flowchart showing an object selection process of the camera of Embodiment 1.

FIG. 3 is a flowchart showing the object selection process performed at step S102 shown in FIG. 1.

Figure 2A:
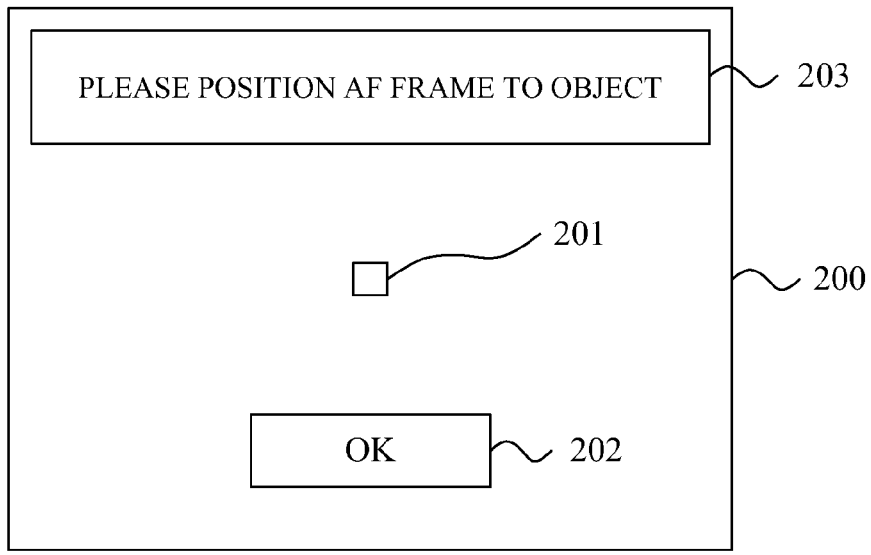
FIG. 2 shows display on a back-face monitor provided in the camera of Embodiment 1.

At step S301, the camera controller 40 causes the main and sub mirrors 20 and 21 to retract to the up position, and starts display of the live view image on the back-face monitor 43 as shown in FIG. 2A. In FIG. 2A, reference numeral 200 denotes an example of the live view image displayed on the back-face monitor 43, and reference numeral 201 denotes a focus detection area for the phase difference AF which is displayed on the live view image in a superimposed manner. The focus detection area for the phase difference AF is hereinafter referred to as "an AF frame". The user adjusts angle of the camera system so as to position the AF frame 201 on an object according to an instruction displayed in an instruction area 203 provided on the back-face monitor 43. The object is desirable to be an object proper for the AF calibration.

When finding the object proper for the AF calibration, the user operates a decision button (not shown) provided in the camera 2 to select "OK" (that is, to click an OK button 202) displayed on the back-face monitor 43 as shown in FIG. 2A.

Next, at step S302, the camera controller 40 determines whether or not the "OK" has been selected, that is, whether or not start of the contrast AF has been selected. The camera controller 40 proceeds to step S303 if the start of the contrast AF has been selected, and repeats the determination at this step if the start of the contrast AF has not been selected.

At step S303, the camera controller 40 performs the contrast AF for the object in the AF frame 201.

Next, at step S304, the camera controller 40 determines whether or not to have detected the contrast in-focus position. If having detected the contrast in-focus position, the camera controller 40 proceeds to step S103 in FIG. 1 to perform the contrast AF data acquisition process. If not having detected the contrast in-focus position, the camera controller 40 proceeds to step S305.

Figure 2B:
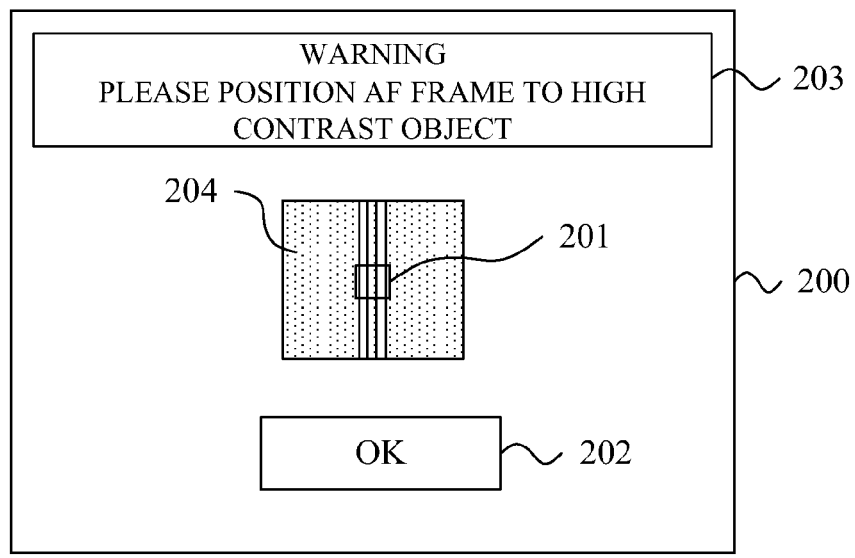

At step S305, the camera controller 40 displays a warning on the back-face monitor 43 as shown in FIG. 2B. In FIG. 2B, reference numeral 204 denotes an object with low contrast. In the instruction area 203, "WARNING" (character) is displayed with a content thereof or a countermeasure thereagainst. As the countermeasure against the low contrast object 204, an instruction to position the AF frame 201 on a high contrast object is displayed. The user sees this warning and then looks for an object proper for the AF calibration again. Warning contents to be displayed in the instruction area 203 is not limited to the above one, and other warning contents may be displayed. An alarm may be output as the warning.

This embodiment enables the user to perform the object selection process in the state of always displaying the live view image of the object on the back-face monitor 43 as described above, which makes it easy for the user to aim at the object. Moreover, this embodiment uses the contrast AF, which eliminates the need of moving the main and sub mirrors 20 and 21, thereby making it possible to prevent accuracy deterioration due to the movement of the mirrors 20 and 21.

Figure 4:
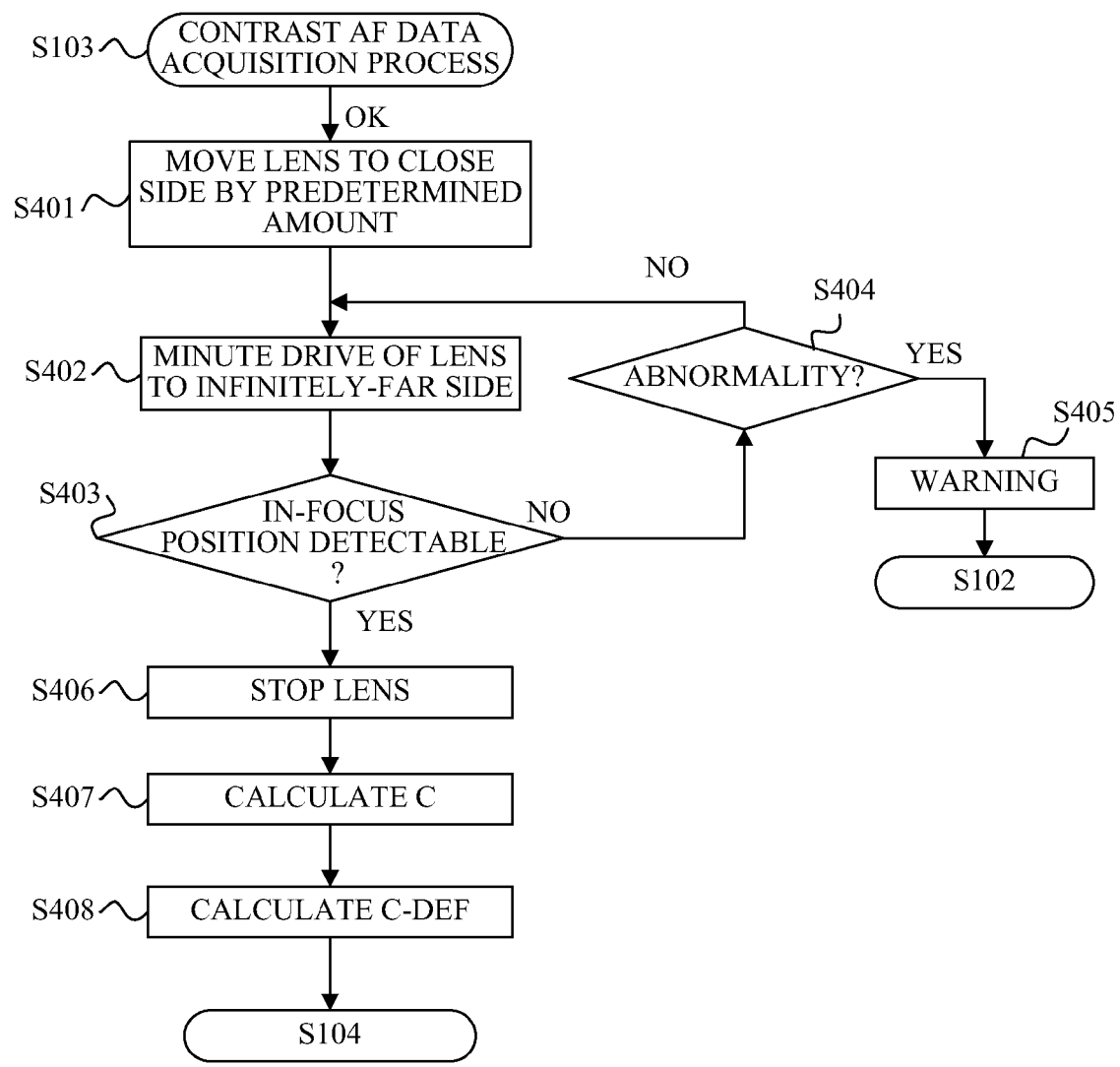
FIG. 4 is a flowchart showing a contrast AF data acquisition process of the camera of Embodiment 1.

FIG. 4 is a flowchart showing the contrast AF data acquisition process performed at step S103 shown in FIG. 1. The contrast AF data are contrast evaluation values used for detecting the contrast in-focus position.

The contrast AF data acquisition process acquires finer and more accurate contrast AF data than those acquired for the contrast AF performed in the live view observation state and the video capturing (image capturing) state. Therefore, this process first performs one-direction drive of the focus lens 10a to remove backlash of the transmission mechanism in the lens driver 11, and then performs minute drive of the focus lens 10a so as to move the focus lens 10a with a fine pitch (fine movement amount).

At step S401, the camera controller 40 drives, through the lens controller 13, the actuator in the lens driver 11 so as to move the focus lens 10a in one direction from an infinitely-far side to a close side by a predetermined movement amount. This corresponds to the above-described one-direction drive of the focus lens 10a.

Next, at step S402, the camera controller 40 performs the minute drive of the focus lens 10a to the infinitely-far side, and sequentially acquires the contrast AF data at each minute drive pitch. The camera controller 40 detects, with the acquisition of the contrast AF data, the position of the focus lens 10a through the lens status detector 12.

Next, at step S403, the camera controller 40 determines, by using the contrast AF data acquired at step S402, whether or not detection of the contrast in-focus position is possible. Since the contrast AF decides a focus lens position (peak position) at which the contrast evaluation value becomes maximum as the contrast in-focus position, it is necessary for detecting the peak position that the contrast evaluation value once decrease after becoming maximum.

Thus, the camera controller 40 at this step determines that the detection of the contrast in-focus position is possible when the contrast evaluation value decreases after becoming maximum, and then proceeds to step S406 to stop the movement of the focus lens 10a. On the other hand, the camera controller 40 determines that the detection of the contrast in-focus position is not yet possible when the contrast evaluation value does not yet decrease after becoming maximum (that is, keeps increasing), and then proceeds to step S404.

At step S404, the camera controller 40 determines presence or absence of abnormality in the contrast AF. For example, the camera controller 40 determines presence of the abnormality when the acquisition of the contrast AF data is difficult because of the low contrast object. In response to the determination of such abnormality, the camera controller 40 proceeds to step S405 to display a warning on the back-face monitor 43. An alarm may be output as the warning. Thereafter, the camera controller 40 returns to step S102 shown in FIG. 1 to cause the user to look for an object enabling normal acquisition of the contrast AF data, and performs the object selection process over again. The camera controller 40 determining absence of the abnormality returns to step S402 to perform the minute drive of the focus lens 10a in order to continuously acquire the contrast AF data.

Next, at step S407, the camera controller 40 calculates the contrast in-focus position C by using the contrast AF data acquired at step S402; specifically, by using the contrast AF data acquired before and after the maximum (peak) of the evaluation value. In the interchangeable lens 1, the backlash of the transmission mechanism in the lens driver 11 moving the focus lens 10a may cause no or insufficient movement of the focus lens 10a in initial several times of the minute drive, but thereafter such no or insufficient movement is removed. Thus, avoiding use of the data in the initial several times of the minute drive (that is, data influenced by the backlash) for the calculation of the contrast in-focus position C enables detection of the contrast in-focus position C with higher accuracy.

At step S408, the camera controller 40 calculates a defocus amount in the contrast AF which corresponds to the above-mentioned "contrast defocus amount C-DEF" by converting difference from the contrast in-focus position C to a current focus lens position into a defocus amount. Specifically, the camera controller 40 first acquires a number of pulses from the contrast in-focus position C to the current focus lens position located on the infinitely far side further than the contrast in-focus position C. This number of pulses can be acquired, from information on the position of the focus lens 10a detected at step S402 at each minute drive pitch, by calculating the difference between the contrast in-focus position C and the current focus lens position. Then, the camera controller 40 converts the calculated number of pulses into the defocus amount, thus enabling the calculation of the contrast defocus amount C-DEF.

After the calculation of the contrast defocus amount C-DEF, the camera controller 40 proceeds to step S104 shown in FIG. 1 to perform the phase difference AF data acquisition process.

Figure 5:
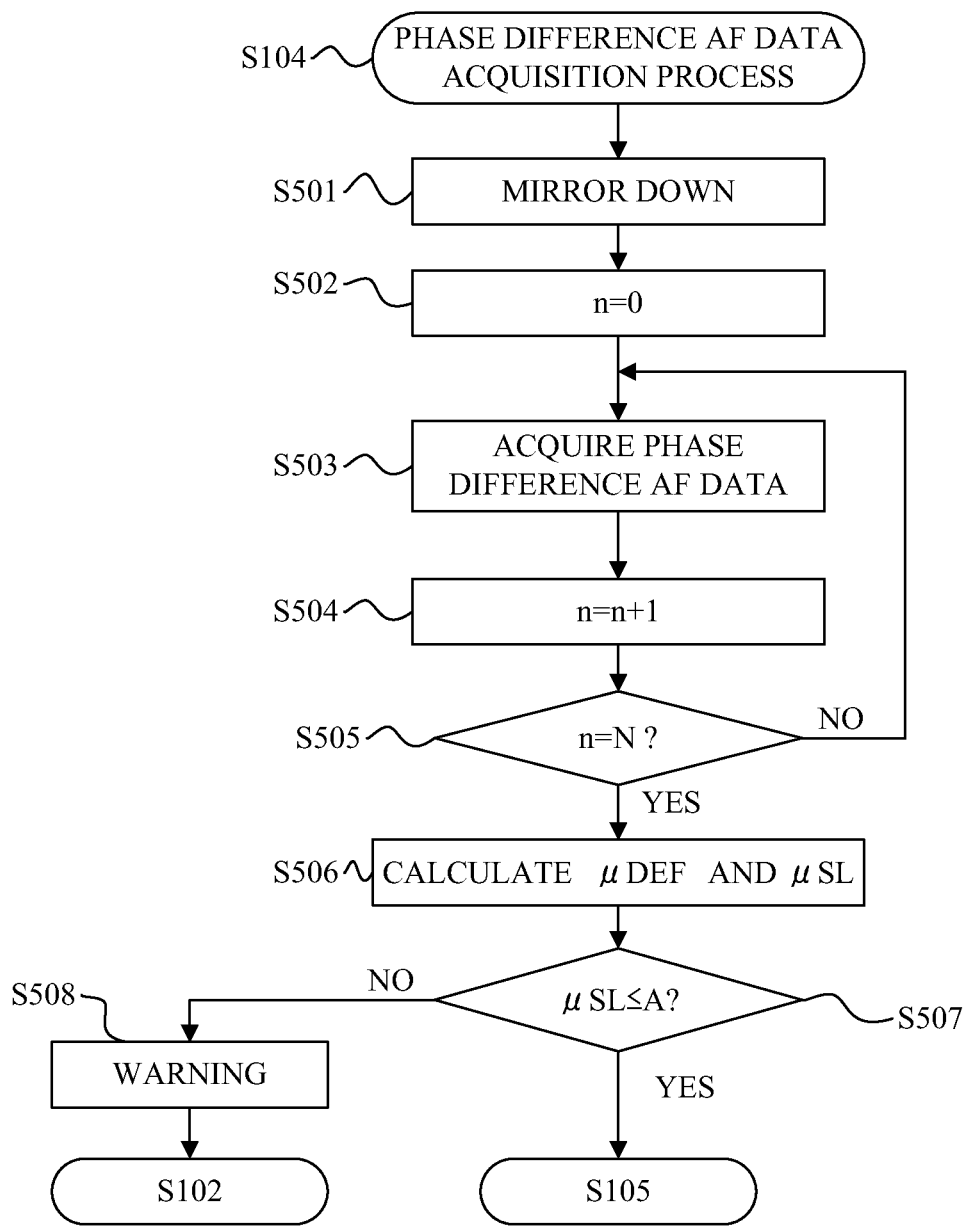
FIG. 5 is a flowchart showing a phase difference AF data acquisition process of the camera of Embodiment 1.

FIG. 5 is a flowchart showing the phase difference AF data acquisition process performed at step S104 shown in FIG. 1.

The phase difference AF data includes the above-mentioned defocus amount DEF for calculating the phase difference in-focus position, the above-described S-level value SL (that is, the coincidence degree U, the correlation change amount ΔV, the sharpness SH and the light and dark ratio PBD) and a charge accumulation time T described later.

At step S501, the camera controller 40 rotates the main and sub mirrors 20 and 21 from the up position in the live view observation state to the down position, and ends the display of the live view image.

Next, at step S502, the camera controller 40 resets its counter n to 0.

Next, at step S503, the camera controller 40 acquires the paired image signals corresponding to the AF frame from the AF sensor 22, calculates the phase difference of the paired image signals, and then calculates the defocus amount DEF of the image pickup optical system 10 from the phase difference. Moreover, the camera controller 40 acquires the coincidence degree U, the correlation change amount ΔV, the sharpness SH and the light and dark ratio PBD to calculate the S-level value SL. In addition, the camera controller 40 acquires information on the charge accumulation time T showing a photoelectric conversion time taken to photoelectrically convert the paired object images for producing the paired image signals in the area sensor of the AF sensor 22.

Next, at step S504, the camera controller 40 increases the counter n by 1.

Next, at step S505, the camera controller 40 determines whether or not the counter n has reached a predetermined value (predetermined plural number of times) N. If the counter n has not reached the predetermined number of times N, the camera controller returns to step S503 to continuously acquire the phase difference AF data. If the counter n has reached the predetermined number of times N, the camera controller 40 proceeds to step S506.

At step S506, the camera controller 40 calculates a mean value of the phase difference AF data acquired N times. Specifically, the camera controller calculates the above-mentioned mean value μDEF of the N defocus amounts DEF and a mean value μSL of the N S-level values SL, the N defocus amounts DEF and the N S-level values SL being included in the phase difference AF data acquired by repeating step S503 N times. The mean defocus amount μDEF is used to calculate the AF correction value at step S105 shown in FIG. 1.

Next, at step S507, the camera controller 40 determines whether or not the mean S-level value μSL calculated at step S506 is equal to or less than a threshold A. If the mean S-level value μSL is equal to or less than the threshold A, that is, the AF reliability level is high, the camera controller 40 proceeds to step S105 shown in FIG. 1 to calculate the AF correction value. On the other hand, if the mean S-level value μSL is larger than the threshold A, that is, the AF reliability level is low, the camera controller 40 proceeds to step S508 to display the above-described warning on the back-face monitor 43. An alarm may be output as the warning.

After the display of the warning at step S508, the camera controller 40 returns to step S102 shown in FIG. 1 to perform the AF calibration over again from the object selection process. Instead of reperforming of the AF calibration, the camera controller 40 may restrict the AF calibration by allowing the user to select whether to reperform the AF calibration or to perform the AF calibration even if the AF reliability level is low.

Figure 6:
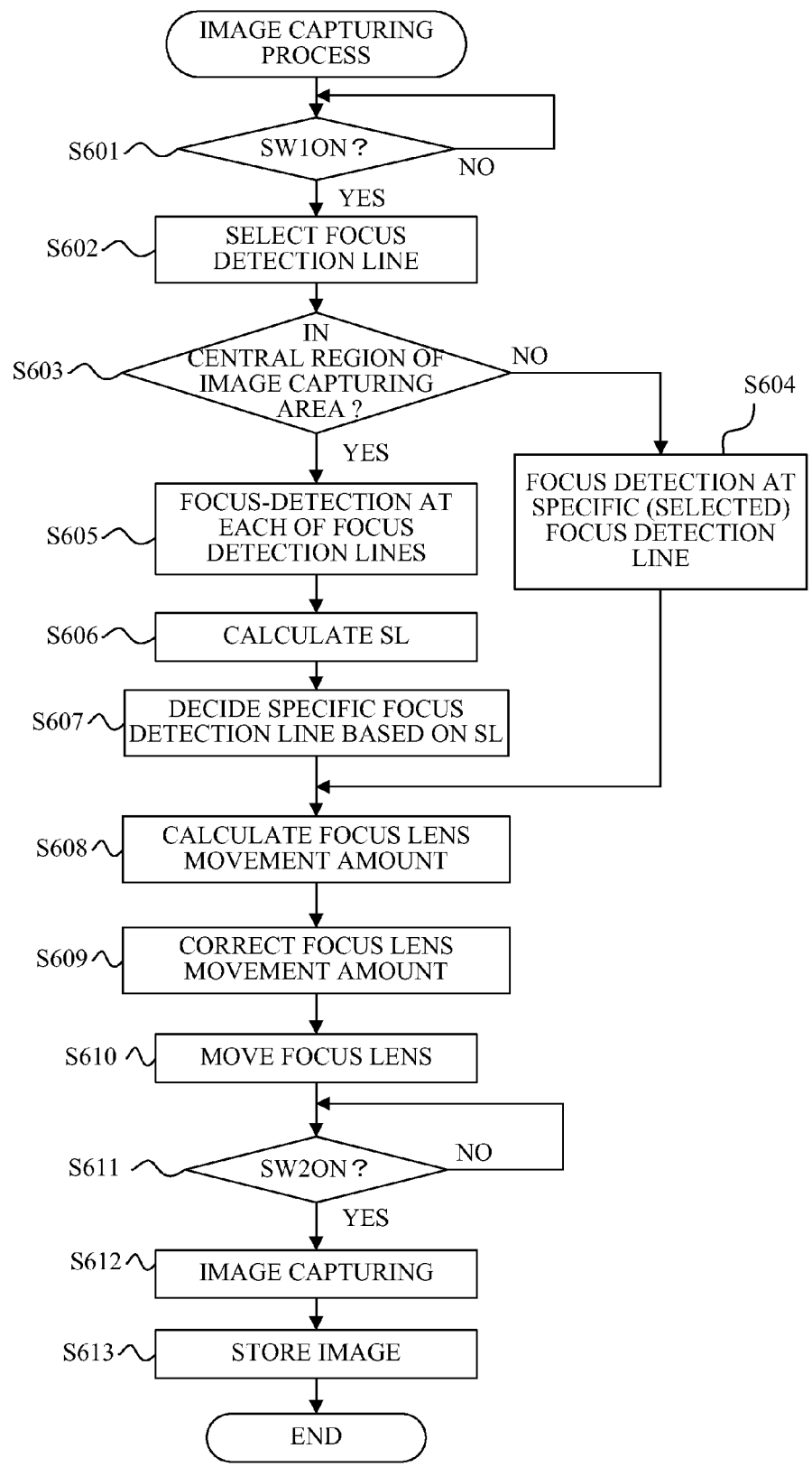
FIG. 6 is a flowchart showing an image capturing process of the camera of Embodiment 1.

FIG. 6 is a flowchart showing the image capturing process performed at step S109 shown in FIG. 1.

At step S601, the camera controller 40 determines whether or not the first switch (SW1) has been turned on by the half-press operation of the release switch (not shown). If the first switch (SW1) has not been turned on, the camera controller 40 waits for the turning-on thereof. If the first switch (SW1) has been turned on, the camera controller 40 proceeds to step S602.

At step S602, the camera controller 40 selects one focus detection line from the 21 focus detection lines provided in the image capturing area, according to a selection operation by the user or a predetermined algorithm.

Next, at step S603, the camera controller 40 determines whether or not the focus detection line selected at step S602 is one of the focus detection lines L1-L4 and L19 included in the central region of the image capturing area. If the selected focus detection line is not one of the focus detection lines in the central region, the camera controller 40 proceeds to step S604. If the selected focus detection line is one of the focus detection lines in the central region, the camera controller 40 proceeds to step S605.

At step S604, the camera controller 40 takes in the paired image signals from the paired light-receiving element rows, which correspond to the selected focus detection line, on the area sensor of the AF sensor 22, and calculates the phase difference of the paired image signals, and then calculates the defocus amount DEF from the phase difference. The camera controller 40 decides the selected focus detection line as a specific focus detection line. Then, the camera controller 40 proceeds to step S608.

At step S605, the camera controller 40 takes in the paired image signals from the paired light-receiving element rows, which correspond to each of the focus detection lines included in the central region of the image capturing area on the area sensor, and calculates the phase difference of the paired image signals for each focus detection line, and then calculates the defocus amount DEF from the phase difference for each focus detection line. Then, the camera controller 40 proceeds to step S606.

At step S606, the camera controller 40 calculates, from the paired image signal taken in at step S605 from each focus detection line, the coincidence degree U, the correlation change amount ΔV, the sharpness SH and the light and dark ratio PBD thereof. In addition, the camera controller 40 calculates the S-level value SL by using these four parameter values for each focus detection line.

Next, at step S607, the camera controller 40 decides, as a specific focus detection line, one focus detection line from which a smallest one of the S-level values SL calculated for the focus detection lines included in the central region of the image capturing area is acquired. Then, the camera controller 40 proceeds to step S608.

At step S608, the camera controller 40 calculates a movement amount (including a movement direction) of the focus lens 10*a* necessary to acquire an in-focus state, from the defocus amount at the specific focus detection line. Specifically, the camera controller 40 calculates a number of driving pulses of the actuator in the lens driver 11 moving the focus lens 10a. The calculation of the movement amount of the focus lens 10a corresponds to calculation of the phase difference in-focus position.

Next, at step S609, the camera controller 40 corrects the movement amount of the focus lens 10a calculated at step S608 by adding the AF correction value acquired by the AF calibration to (or by subtracting the AF correction value from) the movement amount. The correction of the movement amount of the focus lens 10a corresponds to correction of the phase difference in-focus position. When the AF correction value is not produced, since the AF correction value is 0, the camera controller 40 does not perform the correction of the movement amount of the focus lens 10a (that is, the correction of the phase difference in-focus position).

Then, at step S610, the camera controller 40 sends a focus instruction to the lens controller 13 such that the focus lens 10a is moved by the corrected movement amount. In response thereto, the lens controller 13 moves the focus lens 10a to the corrected phase difference in-focus position through the lens driver 11.

Next, at step S611, the camera controller 40 determines whether or not the second switch (SW2) has been turned on by the full-press operation of the release switch. If the second switch (SW2) has not been turned on, the camera controller 40 waits for the turning-on thereof. If the second switch (SW2) has been turned on, the camera controller 40 proceeds to step S612.

At step S612, the camera controller 40 performs image capturing to produce a recording image.

Next, at step S613, the camera controller 40 stores the recording image produced at step S612 to the camera memory 42.

In this embodiment, when calculating the AF correction value in the AF calibration, the camera controller 40 detects the contrast in-focus position and the phase difference in-focus position with the minute drive of the focus lens 10a to the infinitely-far side after moving the focus lens 10a to the close side by a certain movement amount. Use of the AF correction value in the focus operation for actual image capturing in a case of moving the focus lens 10a in a same direction (from the close side to the infinitely-far side in this embodiment) as the focus lens movement direction in the AF calibration causes no problem. However, in a case of moving the focus lens 10a in an opposite direction (from the infinitely-far side to the close side in this embodiment) to the focus lens movement direction in the AF calibration, even though moving the focus lens 10a by the corrected movement amount, the above-described backlash may cause positional shift of the focus lens 10a with respect to the corrected phase difference in-focus position.

Thus, as a method for performing the AF with higher accuracy, the following method may be used. This method prestores, in the interchangeable lens 1, information on difference between detection results of the contrast in-focus positions (second in-focus positions) in a case of moving the focus lens 10a from the close side to the infinitely-far side (that is, in a first direction) and in a case of moving the focus lens 10a from the infinitely-far side to the close side (that is, in a second direction). The camera controller 40 acquires this information to correct the phase difference in-focus position by using the AF correction value and the acquired information.

Specifically, when performing the image capturing, the camera controller 40 determines whether to move the focus lens 10a toward the in-focus position from the close side or from the infinitely-far side. Then, in the case of moving the focus lens 10a in the opposite direction to the focus lens movement direction in the AF calibration, the camera controller 40 further corrects the AF correction value (or the movement amount of the focus lens 10a corrected by the AF correction value) by using the above-mentioned information.

Another method may be employed which performs the AF calibration for each of the focus lens movement directions to store the AF correction values for the respective focus lens movement directions to the camera memory 42. In this case, the camera controller 40 returns to step S103, after performing the AF calibration (first AF calibration) with movement of the focus lens 10a in the first direction (from the close side to the infinitely-far side) and storing the AF correction value (first correction value) with the various information at step S108, to perform the AF calibration (second AF calibration) again with movement of the focus lens 10a in the second direction (from the infinitely-far side to the close side).

At step S401 in FIG. 4, the camera controller 40 drives the actuator in the lens driver 11 so as to move the focus lens 10a to one direction from the close side to the infinitely-far side by a predetermined amount through the lens controller 13. Next, at step S402, the camera controller 40 performs the minute drive of the focus lens 10a to the close side, and sequentially acquires the contrast AF data at each minute drive pitch. Subsequent processes are same as those in the first AF calibration.

Thus, storing the AF correction values (first and second correction values) for the respective focus lens movement directions enables the correction of the movement amount of the focus lens 10a (that is, correction of the phase difference in-focus position) using a proper AF correction value in the actual image capturing. Specifically, the camera controller 40 determines whether to move the focus lens 10a toward the in-focus position from the close side or the infinitely-far side in the image capturing. Then, the camera controller 40 corrects the movement amount (phase difference in-focus position) by using the AF correction value calculated by the AF calibration with movement of the focus lens 10a in a same direction as the determined direction.

The use of such methods makes it possible to perform more highly accurate AF using the AF correction value calculated by the AF calibration.

As described above, this embodiment determines the reliability level of the phase difference AF (that is, of the phase difference AF data) for the object by using the S-level value SL, which can avoid the AF calibration from being performed for an object improper for the phase difference AF. Therefore, this embodiment enables reduction of cases where an erroneous AF correction value is calculated due to improper AF calibration.

Embodiment 2

Next, description will be made of a second embodiment (Embodiment 2) of the present invention. The configuration of a camera system (a digital single-reflex camera and an interchangeable lens) of this embodiment is same as that shown in FIG. 17 in Embodiment 1. Constituent components in this embodiment identical to those in Embodiment 1 are denoted by the same reference numerals as those in Embodiment 1, and description thereof is omitted. Moreover, a layout of focus detection lines, an AF calibration process, a contrast AF data acquisition process and an image capturing process in this embodiment are same as those respectively shown in FIGS. 18, 1, 5 and 6 in Embodiment 1.

Figure 7:
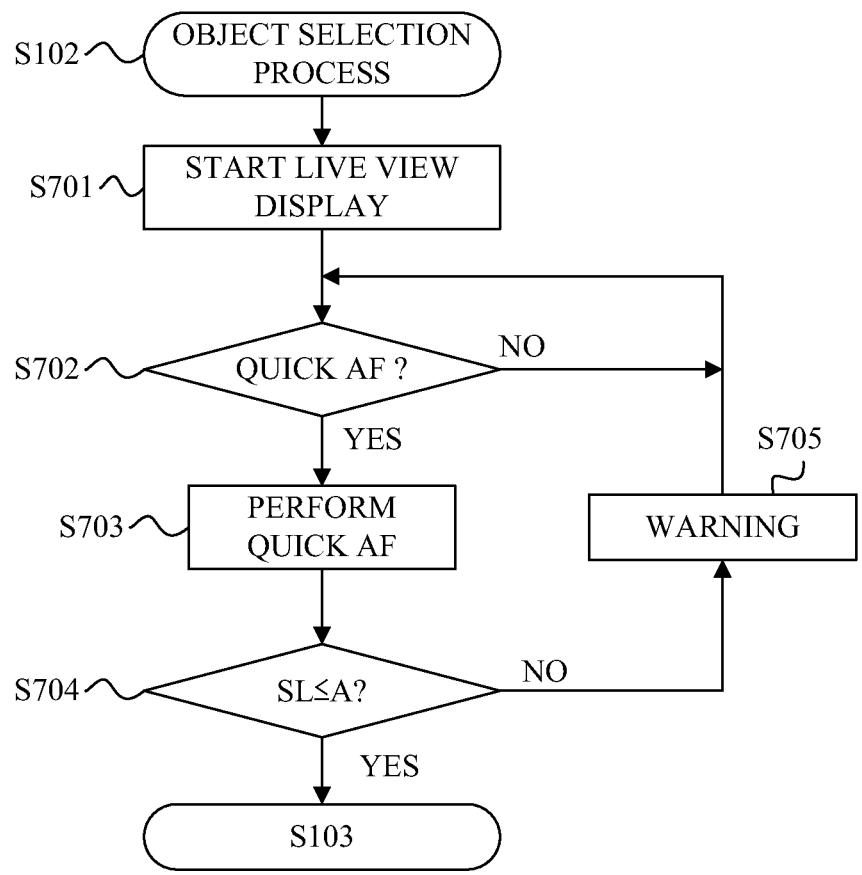
FIG. 7 is a flowchart showing an object selection process of a camera that is Embodiment 2 of the present invention.
Figure 8:
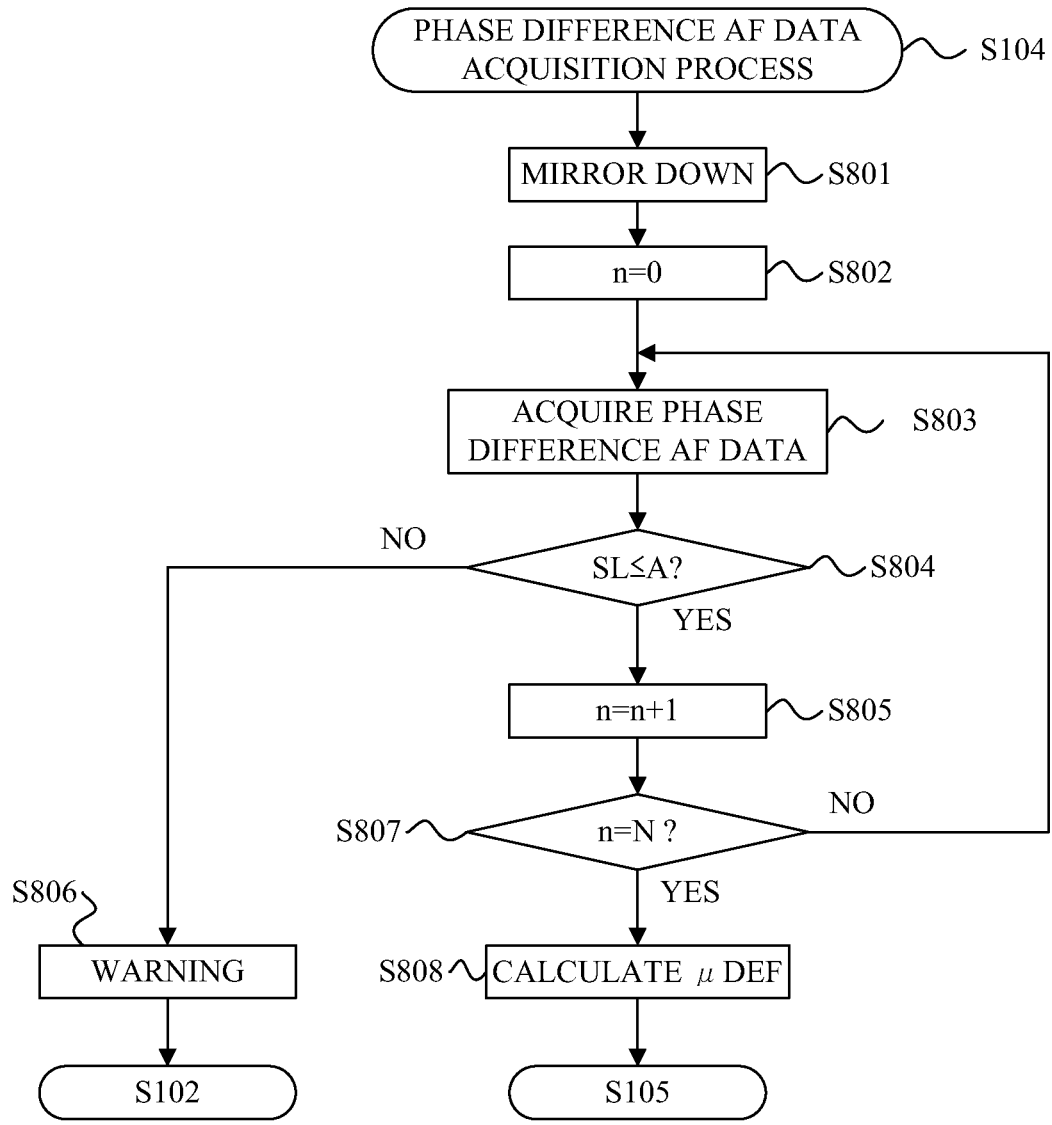
FIG. 8 is a flowchart showing a phase difference AF data acquisition process (Pattern 1) of the camera of Embodiment 2.

FIG. 7 is a flowchart showing an object selection process in this embodiment.

At step S701, the camera controller 40 starts display of the live view image on the back-face monitor 43.

Next, at step S702, the camera controller 40 determines whether or not to start focus detection by quick AF. The quick AF is a function of instantaneously performing the following operation from the live view observation state.

The camera controller 40 first rotates the main and sub mirrors 20 and 21 from the up position to the down position to introduce the light from the image pickup optical system 10 to the AF sensor 22 as shown in FIG. 17. Next, the camera controller 40 performs the phase difference AF to move the focus lens 10a to the phase difference in-focus position, and then retracts the main and sub mirrors 20 and 21 to the up position to return the camera to the live view observation state. At the same time as performing the phase difference AF, the camera controller 40 acquires the phase difference AF data described in Embodiment 1. If starting the quick AF, the camera controller 40 proceeds to step S703 to actually perform the quick AF and acquire the phase difference AF data. If not starting the quick AF, the camera controller 40 waits for the start thereof.

Next, at step S704, the camera controller 40 determines whether or not the S-level value SL acquired as the phase difference AF data at step S702 is equal to or less than a threshold A. If the S-level value SL is equal to or less than the threshold A, the camera controller 40 determines that a currently selected object is a proper object increasing the reliability level of the phase difference AF (AF reliability level), and then proceeds to step S103 shown in FIG. 1 to perform the contrast AF data acquisition process.

On the other hand, if the S-level value SL is larger than the threshold A, the camera controller 40 determines that the currently selected object is an improper object decreasing the AF reliability level, and then proceeds to step S705 to display the warning in the instruction area 203 on the back-face monitor 43 as shown in FIG. 2B. Warning contents to be displayed in the instruction area 203 is not limited to the above one, and other warning contents may be displayed. An alarm may be output as the warning. Then, the camera controller 40 returns, in response to selection of "OK" (operation of the OK button 202), to step S702 to perform the quick AF again with looking for a new object.

This object selection process can acquire the phase difference AF data and grasp the S-level value SL before the AF data acquisition process and phase difference AF data acquisition process are subsequently performed at steps S103 and S104. Such advance determination of the S-level value SL enables the user to look for a proper object without uselessly acquiring the contrast AF data and the phase difference AF data, which makes it possible to perform efficient object selection.

Description will hereinafter be made of four patterns of the phase difference AF data acquisition process with reference to FIGS. 8 to 11. A first pattern (Pattern 1) will be first described with reference to FIG. 8.

At step S801, the camera controller 40 rotates the main and sub mirrors 20 and 21 from the up position in the live view observation state to the down position, and ends the display of the live view image.

Next, at step S802, the camera controller 40 resets its counter n to 0.

Next, at step S803, the camera controller 40 acquires the phase difference AF data.

Next, at step S804, the camera controller 40 determines whether or not the S-level value SL acquired as the phase difference AF data at step S803 is equal to or less than the threshold A. If the S-level value SL is equal to or less than the threshold A, that is, the AF reliability level is high, the camera controller 40 proceeds to step S805. On the other hand, if the S-level value SL is larger than the threshold A, that is, the AF reliability level is low, the camera controller 40 proceeds to step S806.

At step S805, the camera controller 40 increases the counter n by 1, and then proceeds to step S807.

At step S806, the camera controller 40 displays a warning in the instruction area 203 on the back-face monitor 43 as shown in FIG. 2B. Warning contents to be displayed in the instruction area 203 is not limited to the above one, and other warning contents may be displayed. An alarm may be output as the warning. After the display of the warning, the camera controller 40 returns to step S102 shown in FIG. 1 to perform the AF calibration over again from the object selection process.

At step S807, the camera controller 40 determines whether or not the counter n has reached a predetermined plural number of times N. If the counter n has not reached the predetermined number of times N, the camera controller 40 returns to step S803 to continuously acquire the phase difference AF data. If the counter n has reached the predetermined number of times N, the camera controller 40 proceeds to step S808.

At step S808, the camera controller 40 calculates a mean value μDEF of N defocus amounts DEF from the phase difference AF data acquired by repeating step S803 N times. After the calculation of the mean defocus amount μDEF, the camera controller 40 proceeds to step S105 in FIG. 1 to calculate the AF correction value.

Figure 9:
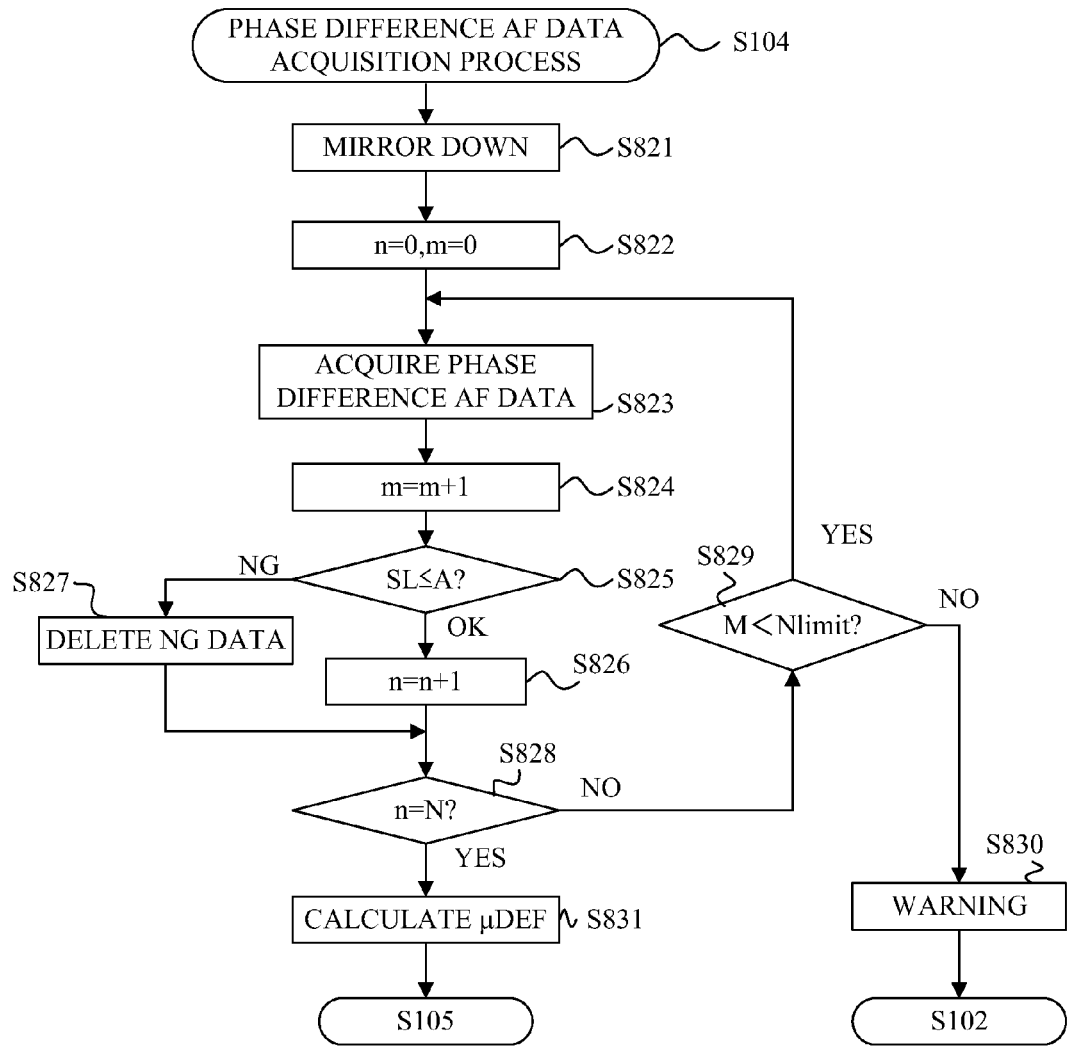
FIG. 9 is a flowchart showing a phase difference AF data acquisition process (Pattern 2) of the camera of Embodiment 2.

Next, a second pattern (Pattern 2) will be described with reference to FIG. 9.

At step S821, the camera controller 40 rotates the main and sub mirrors 20 and 21 from the up position in the live view observation state to the down position, and ends the display of the live view image.

Next, at step S822, the camera controller 40 resets its counters n and m to 0.

Next, at step S823, the camera controller 40 acquires the phase difference AF data.

Next, at step S824, the camera controller 40 increases the counter m by 1.

Next, at step S825, the camera controller 40 determines whether or not the S-level value SL acquired as the phase difference AF data at step S823 is equal to or less than the threshold A. If the S-level value SL is equal to or less than the threshold A, that is, the AF reliability level is high, the camera controller 40 proceeds to step S826. On the other hand, if the S-level value SL is larger than the threshold A, that is, the AF reliability level is low, the camera controller 40 proceeds to step S827.

At step S827, the camera controller 40 deletes data of the defocus amount as NG data when determining that the S-level value SL is larger than the threshold A and therefore the AF reliability is low at step S825. After the data deletion, the camera controller 40 proceeds to step S828.

At step S828, the camera controller 40 determines whether or not the counter n has reached a predetermined plural number of times N. If the counter n has not reached the predetermined number of times N, the camera controller 40 proceeds to step S829. If the counter n has reached the predetermined number of times N, the camera controller 40 proceeds to step S831.

At step S829, the camera controller 40 determines whether or not the counter m has reached a limit value Nlimit of a number of measurement times (hereinafter referred to as "a limit measurement number of times Nlimit"). The limit measurement number of times Nlimit is larger than the predetermined number of times N. If the counter m has not reached the limit measurement number of times Nlimit, the camera controller 40 returns to step S823 to continuously acquire the phase difference AF data. If the counter m has reached the limit measurement number of times Nlimit, that is, if a number of times of acquisition of the NG data increases and thereby the counter m has reached the limit measurement number of times Nlimit before the camera controller 40 acquires highly reliable data N times, the camera controller 40 proceeds to step S830.

At step S830, the camera controller 40 displays a warning in the instruction area 203 on the back-face monitor 43 as shown in FIG. 2B. Warning contents to be displayed in the instruction area 203 is not limited to the above one, and other warning contents may be displayed. An alarm may be output as the warning. After the display of the warning, the camera controller 40 returns to step S102 shown in FIG. 1 to perform the AF calibration over again from the object selection process.

At step S831, the camera controller 40 calculates a mean value μDEF of N defocus amounts DEF from the phase difference AF data acquired by repeating step S823 N times. After the calculation of the mean defocus amount μDEF, the camera controller 40 proceeds to step S105 in FIG. 1 to calculate the AF correction value.

Although Pattern 2 described the case of performing the warning operation in response to the measurement number of times reaching the limit measurement number of times Nlimit, the warning operation may be performed in response to a time counted by a timer reaching a predetermined time.

Figure 10:
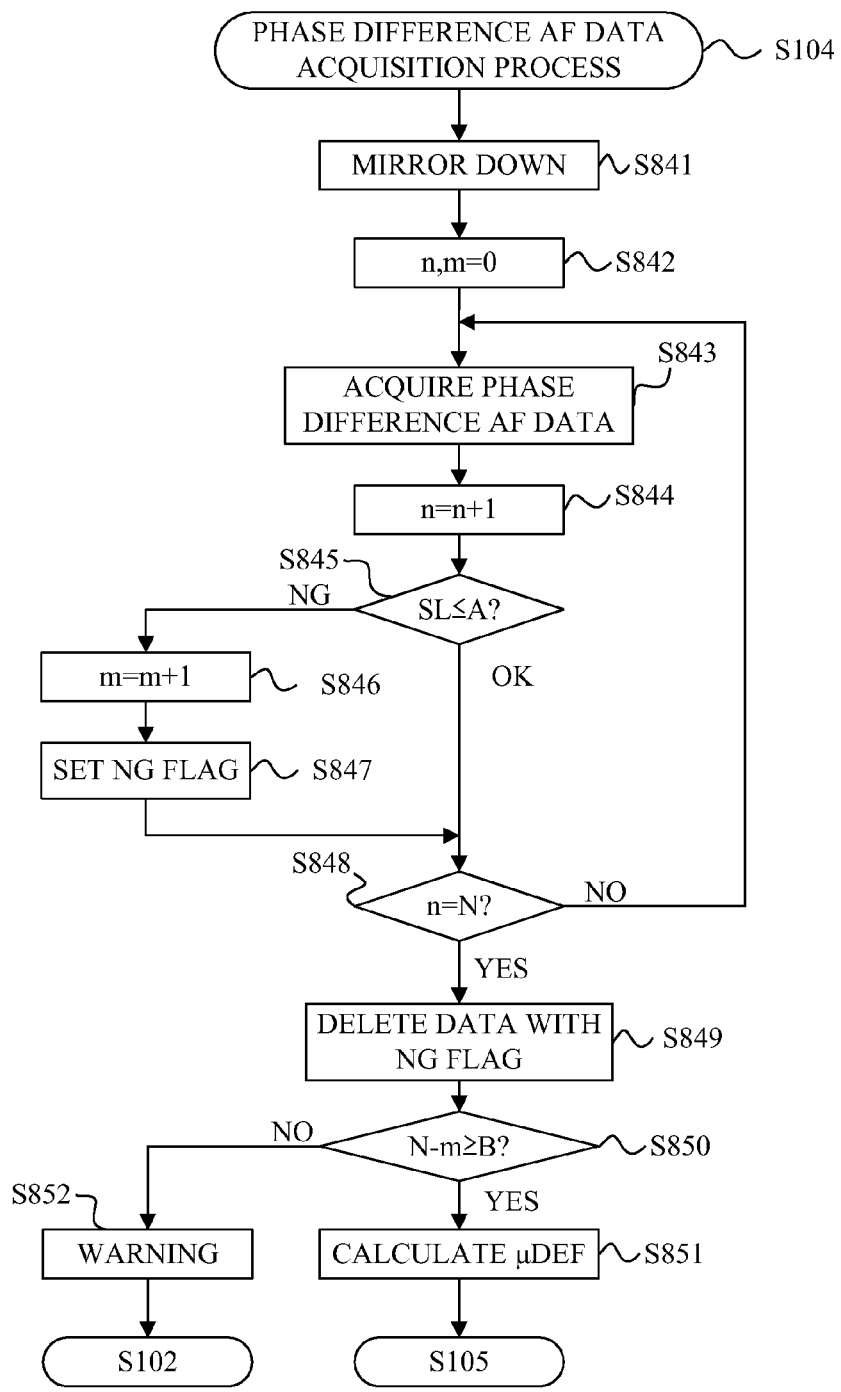
FIG. 10 is a flowchart showing a phase difference AF data acquisition process (Pattern 3) of the camera of Embodiment 2.

Next, a third pattern (Pattern 3) will be described with reference to FIG. 10.

At step S841, the camera controller 40 rotates the main and sub mirrors 20 and 21 from the up position in the live view observation state to the down position, and ends the display of the live view image.

Next, at step S842, the camera controller 40 resets its counters n and m to 0.

Next, at step S843, the camera controller 40 acquires the phase difference AF data.

Next, at step S844, the camera controller 40 increases the counter n by 1.

Next, at step S845, the camera controller 40 determines whether or not the S-level value SL acquired as the phase difference AF data at step S843 is equal to or less than the threshold A. If the S-level value SL is equal to or less than the threshold A, that is, the AF reliability is high, the camera controller 40 proceeds to step S848. On the other hand, if the S-level value SL is larger than the threshold A, that is, the AF reliability is low, the camera controller 40 proceeds to step S846.

At step S846, the camera controller 40 increases the counter m by 1, and then proceeds to step S847.

At step S847, the camera controller 40 sets an NG flag showing that data of the defocus amount calculated when the low reliability determination has been made because of the S-level value SL larger than the threshold A at step S845. Then, the camera controller 40 proceeds to step S848.

At step S848, the camera controller 40 determines whether or not the counter n has reached a predetermined plural number of times N. If the counter n has not reached the predetermined number of times N, the camera controller 40 returns to step S843 to continuously acquire the phase difference AF data. If the counter n has reached the predetermined number of times N, the camera controller 40 proceeds to step S849.

At step S849, the camera controller 40 deletes the data of the defocus amount to which the NG flag is set.

Next, at step S850, the camera controller 40 calculates a value of (N−m) showing a number of data of highly reliable defocus amounts remaining without being deleted at step S849, and determines whether or not the value of (N−m) is equal to or larger than a predetermined value B. If the value of (N−m) is equal to or larger than the predetermined value B, the camera controller 40 proceeds to step S851. If the value of (N−m) is smaller than the predetermined value B, the camera controller 40 proceeds to step S852.

At step S851, the camera controller 40 calculates a mean value μDEF of N defocus amounts DEF from the phase difference AF data acquired by repeating step S843 N times. After the calculation of the mean defocus amount μDEF, the camera controller 40 proceeds to step S105 in FIG. 1 to calculate the AF correction value.

At step S852, the camera controller 40 displays a warning in the instruction area 203 on the back-face monitor 43 as shown in FIG. 2B. Warning contents to be displayed in the instruction area 203 is not limited to the above one, and other warning contents may be displayed. An alarm may be output as the warning. After the display of the warning, the camera controller 40 returns to step S102 shown in FIG. 1 to perform the AF calibration over again from the object selection process.

Figure 11:
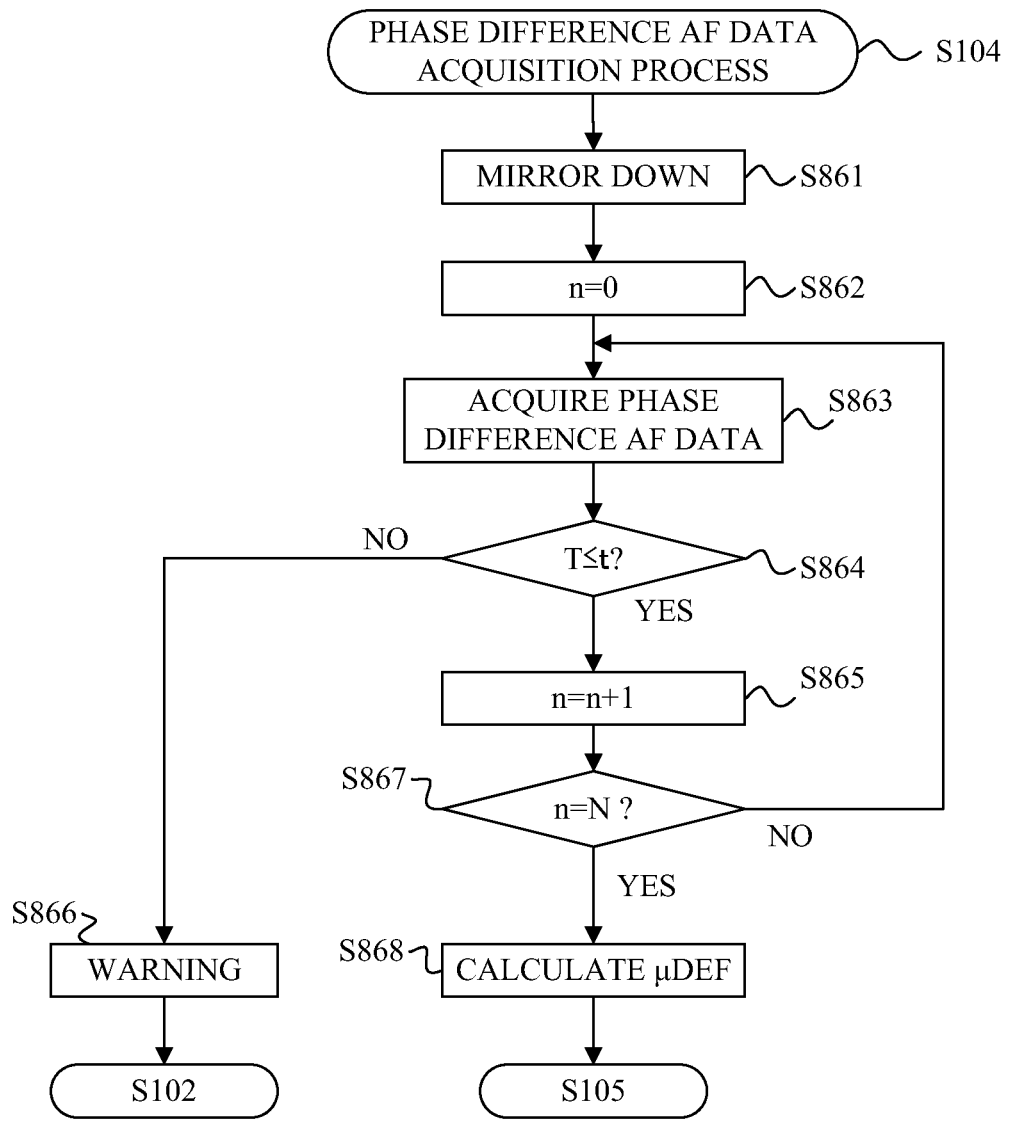
FIG. 11 is a flowchart showing a phase difference AF data acquisition process (Pattern 4) of the camera of Embodiment 2.

Next, a fourth pattern (Pattern 4) will be described with reference to FIG. 11.

At step S861, the camera controller 40 rotates the main and sub mirrors 20 and 21 from the up position in the live view observation state to the down position, and ends the display of the live view image.

Next, at step S862, the camera controller 40 resets its counter n to 0.

Next, at step S863, the camera controller 40 acquires the phase difference AF data.

Next, at step S864, the camera controller 40 determines whether or not the charge accumulation time T acquired as the phase difference AF data at step S863 is equal to or shorter than a predetermined time t. If the charge accumulation time T is equal to or shorter than the predetermined time t, the camera controller 40 proceeds to step S865. On the other hand, if the charge accumulation time T is longer than the predetermined time t, the camera controller 40 proceeds to step S866.

At step S865, the camera controller 40 increases the counter n by 1, and then proceeds to step S867.

At step S866, the camera controller 40 displays a warning in the instruction area 203 on the back-face monitor 43 as shown in FIG. 2B. Warning contents to be displayed in the instruction area 203 is not limited to the above one, and other warning contents may be displayed. An alarm may be output as the warning. After the display of the warning, the camera controller 40 returns to step S102 shown in FIG. 1 to perform the AF calibration over again from the object selection process.

At step S867, the camera controller 40 determines whether or not the counter n has reached a predetermined plural number of times N. If the counter n has not reached the predetermined number of times N, the camera controller 40 returns to step S863 to continuously acquire the phase difference AF data. If the counter n has reached the predetermined number of times N, the camera controller 40 proceeds to step S868.

At step S868, the camera controller 40 calculates a mean value μDEF of N defocus amounts DEF from the phase difference AF data acquired by repeating step S863 N times. After the calculation of the mean defocus amount μDEF, the camera controller 40 proceeds to step S105 in FIG. 1 to calculate the AF correction value.

In Pattern 4, since step S861 ends the display of the live view image, the user is in a state of being difficult to select (specify) a proper object. In such a state, increase of the charge accumulation time T increases time to acquire the phase difference AF data, that is, time to select the proper object. Impossibility of the selection of the proper object may cause acquisition of erroneous phase difference AF data, which may cause calculation of an erroneous AF correction value. Thus, Pattern 4 performs determination based on the charge accumulation time T. Moreover, since a dark object increases the charge accumulation time T, so that, with the warning operation at step S866, a message for promoting selection of a bright image may be displayed in the instruction part 203 shown in FIG. 2B.

As described above, this embodiment acquires the S-level value and determines the improper object at the stage where the user looks for the proper object, which enables use's easy proper object selection.

In addition, Pattern 1 performs the determination of the S-level value SL for the respective phase difference AF data acquired plural number of times, and performs the AF calibration over again immediately when detecting the NG data. Thus, Pattern 1 does not need steps for acquiring the phase difference AF data plural number of times until performing the AF calibration over again, which enables efficient AF calibration that can be more quickly performed over again.

Moreover, Pattern 2 repeats the acquisition of the phase difference AF data until acquiring the data from which the satisfactory S-level values SL are acquired the predetermined number of times, which makes it possible to continue the acquisition of the data without discontinuation even if the reliability level of the phase difference AF data becomes low in the middle of the phase difference AF data acquisition process.

Moreover, Pattern 3 removes, when there are some low reliable data in the phase difference AF data acquired the plural number of times, only the low reliable data, and calculates the AF correction value by using the remaining highly-reliable data, which enables reduction of the number of times of reperforming the AF calibration to a minimum and enables the acquisition of the data generating no erroneous AF correction value.

Furthermore, Pattern 4 performs the determination of the charge accumulation time T in order to reduce the time for the acquisition of the phase difference AF data, which reduces the time for selecting the proper object by the user, thereby enabling prevention of erroneous data acquisition.

Embodiment 3

Next, description will be made of a third embodiment (Embodiment 3) of the present invention. The configuration of a camera system (a digital single-reflex camera and an interchangeable lens) of this embodiment is same as that shown in FIG. 17 in Embodiment 1. Constituent components in this embodiment identical to those in Embodiment 1 are denoted by the same reference numerals as those in Embodiment 1, and description thereof is omitted. Moreover, a layout of focus detection lines is same as that shown in FIG. 18 in Embodiment 1.

Figure 12:
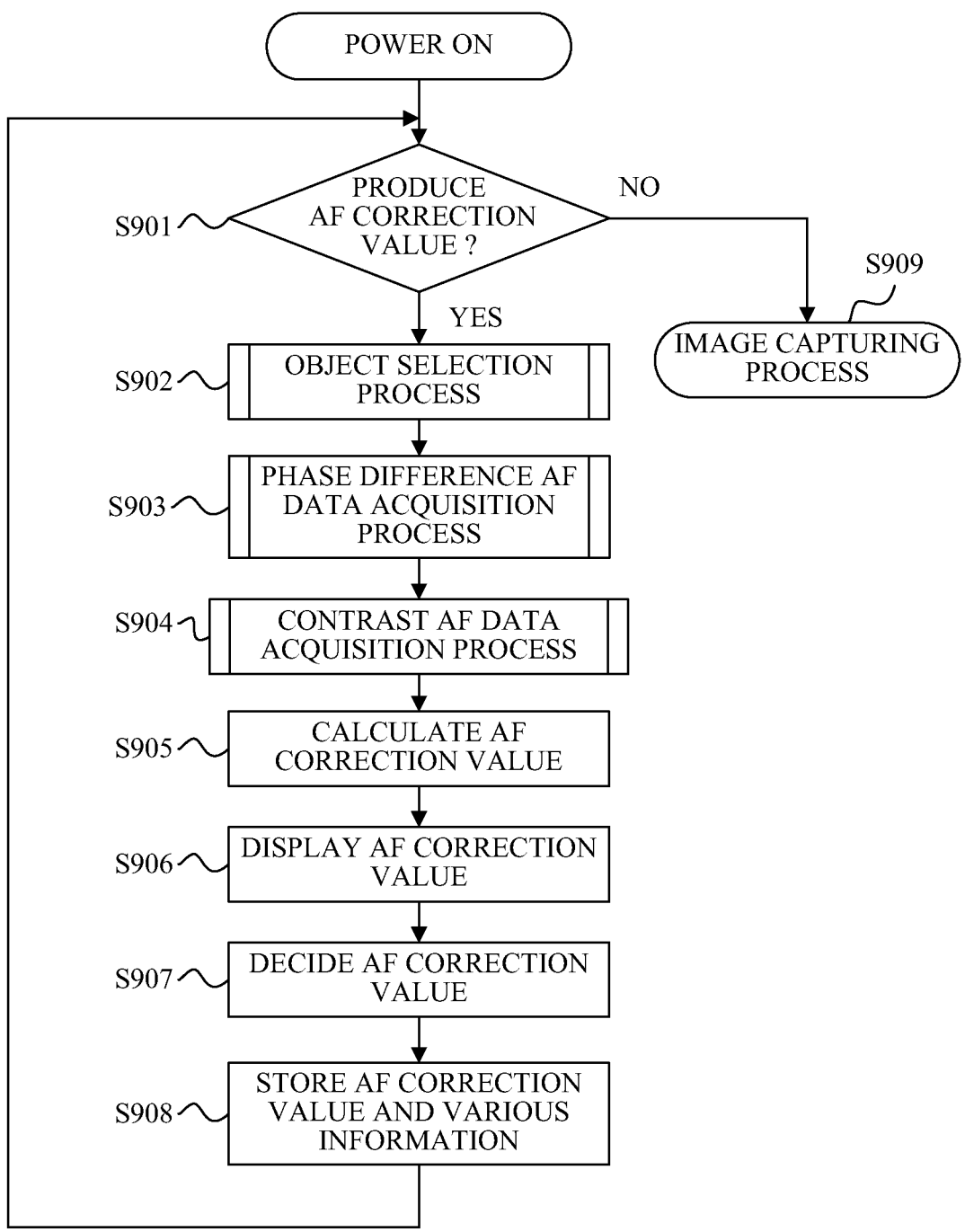
FIG. 12 is a flowchart showing an AF calibration process of a camera that is Embodiment 3 of the present invention.

FIG. 12 is a flowchart showing processes for the AF calibration mainly performed by the camera controller 40. The camera controller 40 executes these processes and other processes described later according to computer programs. The following description will be mainly made of different parts from the processes for the AF calibration shown by the flowchart shown in FIG. 1 in Embodiment 1.

At step S901, the camera controller 40 performs same process as that at step S101 in FIG. 1. The camera controller 40 proceeds to step S902 if producing the AF correction value, and the camera controller 40 proceeds to step S909 to enter an image capturing process (image capturing flow) if not producing the AF correction value. Detail of the image capturing process will be described later.

At step S902, the camera controller 40 performs an object selection process. Detail of the object selection process will be described later.

Next, at step S903, the camera controller 40 performs a phase difference AF data acquisition process. Detail of the phase difference AF data acquisition process will be described later.

Next, at step S904, the camera controller 40 performs a contrast AF data acquisition process. Detail of the contrast AF data acquisition process will be described later.

Furthermore, at step S905, the camera controller 40 performs a same process as that at step S105 in FIG. 1.

Next, at step S906, the camera controller 40 performs a same process as that at step S106 in FIG. 1.

Next, at step S907, the camera controller 40 performs a same process as that at step S107 in FIG. 1.

Then, at step S908, the camera controller 40 performs a same process as that at step S108 in FIG. 1. After storing the AF correction value with various information to be added thereto, the camera controller 40 returns to step S901.

Figure 13:
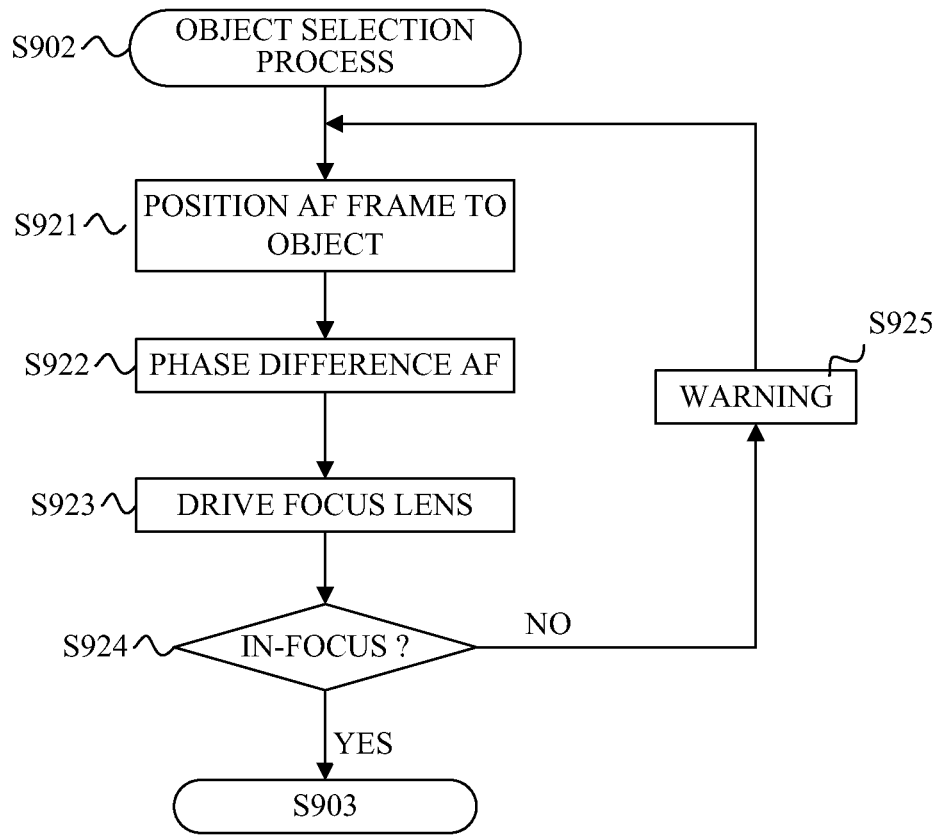
FIG. 13 is a flowchart showing an object selection process of the camera of Embodiment 3.

FIG. 13 is a flowchart showing the object selection process performed at step S902 shown in FIG. 12.

At step S921, a user adjusts angle of the camera system so as to position an AF frame (201 shown in FIG. 2A) on an object. The object is desirable to be an object proper for the AF calibration. When positioning the AF frame on the object, the user operates a decision button (not shown) provided in the camera 2. The camera controller 40 proceeds, in response to the operation of the decision button, to step S922.

At step S922, the camera controller 40 performs the phase difference AF for the object in the AF frame through the AF sensor 22.

Then, at step S923, the camera controller 40 causes the actuator in the lens driver 11 to move the focus lens 10a according to a result of the phase difference AF at step S922, so as to obtain an in-focus state for the object.

Next, at step S924, the camera controller 40 determines whether or not the in-focus state for the object has been obtained. If the in-focus state has been obtained, the camera controller 40 regards the object as a proper object for the AF calibration to proceed to step S903. If the in-focus state has not been obtained, the camera controller 40 proceeds to step S925 to perform a warning operation so as to cause the user to find a proper object for the AF calibration. The warning operation includes display of a warning on a TFT or in a viewfinder and output of an alarm. After the warning operation, the camera controller 40 returns to step S921 again to repeat the object selection process.

Figure 14:
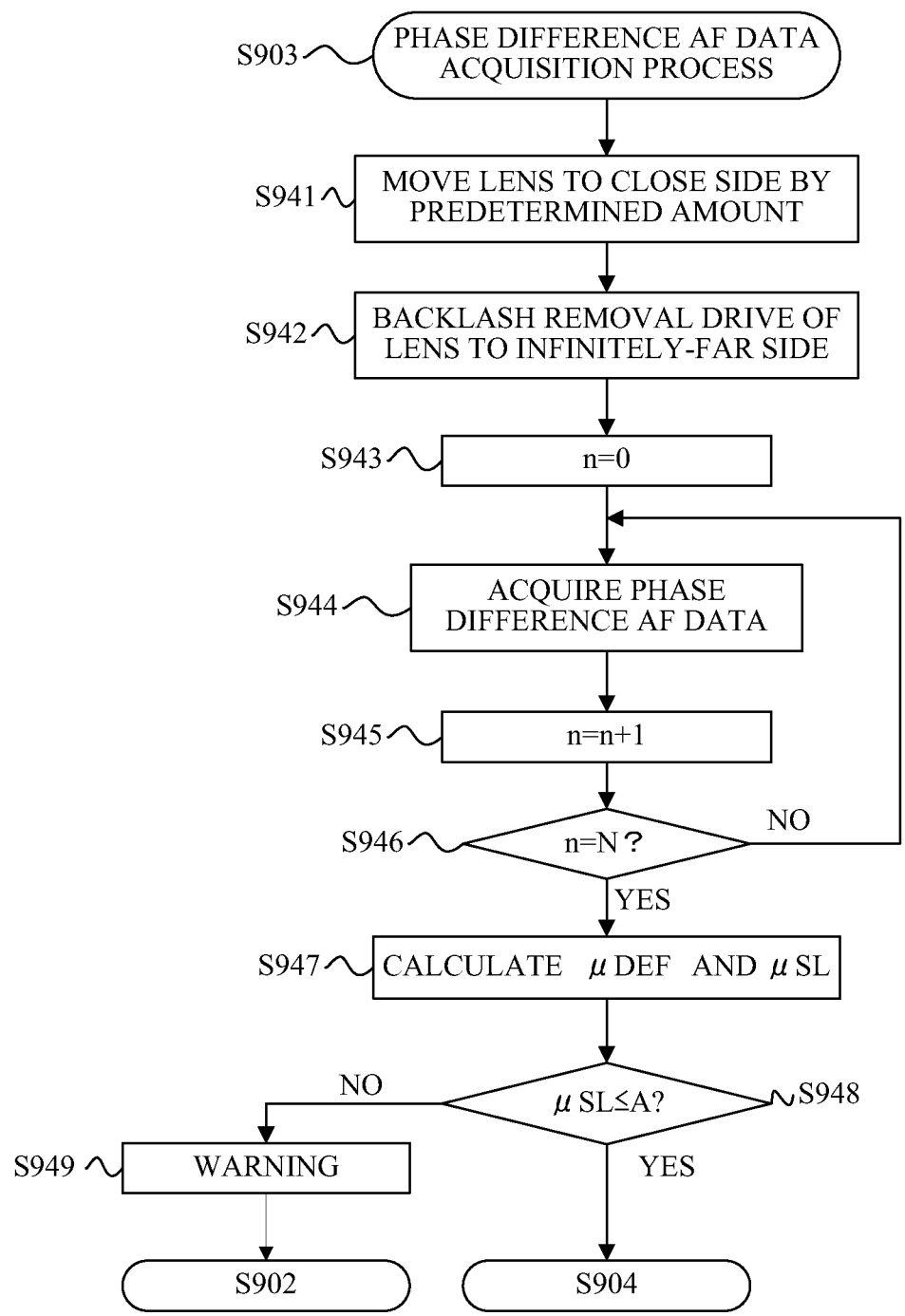
FIG. 14 is a flowchart showing a phase difference AF data acquisition process of the camera of Embodiment 3.

FIG. 14 is a flowchart showing the phase difference AF data acquisition process performed at step S903 shown in FIG. 12. The phase difference AF data are same as those described in Embodiment 1.

Description will herein be made of focus lens drive in the AF calibration. In order to improve accuracy of the AF calibration, the contrast AF data acquisition process, which will be described later, acquires finer and more accurate contrast AF data than those acquired for the contrast AF performed in the live view observation state and the video capturing (image capturing) state. Therefore, this process first performs one-direction drive of the focus lens 10a to make focus lens movement amounts stable, and then performs minute drive of the focus lens 10a so as to move the focus lens 10a with a fine pitch (fine movement amount) in order to acquire the finer and more accurate contrast AF data. The one-direction drive of the focus lens 10a receives influence of backlash of the transmission mechanism in the lens driver 11. Thus, the contrast AF data acquisition process in this embodiment performs backlash reduction drive of the focus lens 10a (that is, of the transmission mechanism) in order to reduce (desirably, in order to remove) correction errors due to the backlash.

At step S941, the camera controller 40 first drives, through the lens controller 13, the actuator in the lens driver 11 so as to move the focus lens 10a in one direction from the infinitely-far side to the close side by a predetermined movement amount. This corresponds to the above-described one-direction drive of the focus lens 10a.

Next, at step S942, the camera controller 40 drives, through the lens controller 13, the actuator so as to move the focus lens 10a to the infinitely-far side by a predetermined backlash removal movement amount. This drive of the focus lens 10a corresponds to the backlash removal drive. The backlash removal movement amount is decided for each interchangeable lens (that is, based on individual variability of the transmission mechanisms).

Next, at step S943, the camera controller 40 resets its counter n to 0.

Next, at step S944, the camera controller 40 acquires paired image signals corresponding to the AF frame from the AF sensor 22, calculates the phase difference of the paired image signals, and then calculates a defocus amount DEF of the image pickup optical system 10 from the phase difference. Moreover, the camera controller 40 acquires the above-mentioned coincidence degree U, correlation change amount ΔV, sharpness SH and light and dark ratio PBD to calculate the S-level value SL.

In addition, the camera controller 40 acquires information on a charge accumulation time T showing a photoelectric conversion time for which the photoelectric conversion of paired object images into the paired image signals by the area sensor of the AF sensor 22 is performed.

Next, at step S945, the camera controller 40 increases the counter n by 1.

Next, at step S946, the camera controller 40 determines whether or not the counter n has reached a predetermined value (predetermined plural number of times) N. If the counter n has not reached the predetermined number of times N, the camera controller returns to step S944 to continuously acquire the phase difference AF data. If the counter n has reached the predetermined number of times N, the camera controller 40 proceeds to step S947.

At step S947, the camera controller 40 calculates a mean value of the phase difference AF data acquired N times. Specifically, the camera controller calculates mean values μDEF and μSL of N defocus amounts DEF and N S-level values SL that are included in the phase difference AF data acquired by repeating step S944 N times. The mean defocus amount μDEF is used to calculate the AF correction value at step S905 shown in FIG. 12.

Next, at step S948, the camera controller 40 determines whether or not the mean S-level value μSL calculated at step S947 is equal to or less than a threshold A. If the mean S-level value μSL is equal to or less than the threshold A, that is, the AF reliability level is high, the camera controller 40 proceeds to step S904 shown in FIG. 12 to perform the contrast AF data acquisition process. On the other hand, if the mean S-level value μSL is larger than the threshold A, that is, the AF reliability level is low, the camera controller 40 proceeds to step S949 to display a warning on the back-face monitor 43 as shown in FIG. 2B.

After the display of the warning at step S949, the camera controller 40 returns to step S902 shown in FIG. 12 to perform the AF calibration over again from the object selection process.

Figure 15:
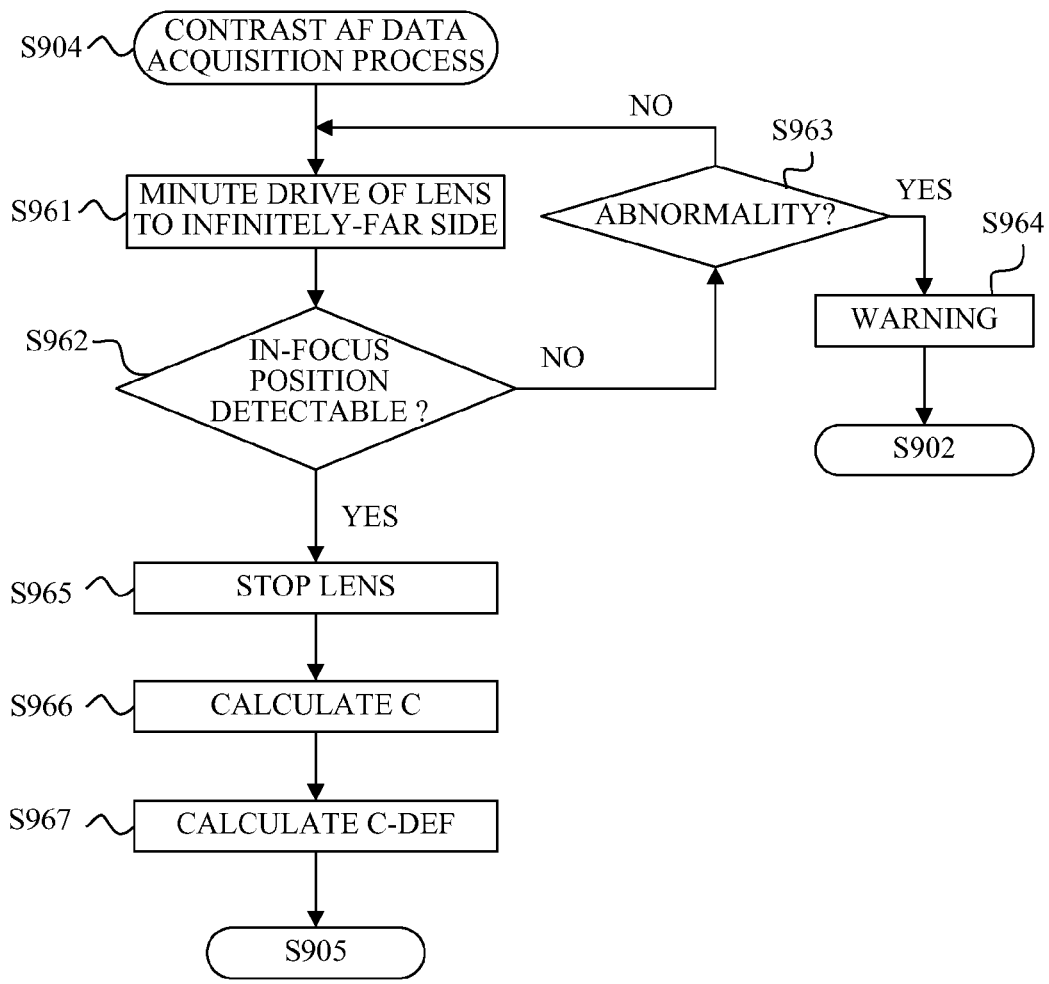
FIG. 15 is a flowchart showing a contrast AF data acquisition process of the camera of Embodiment 3.

FIG. 15 is a flowchart showing the contrast AF data acquisition process performed at step S904 shown in FIG. 12. The contrast AF data acquisition process acquires, as described above, the finer and more accurate contrast AF data than those acquired for the contrast AF performed in the live view observation state and the video capturing (image capturing) state, and therefore performs the minute drive of the focus lens 10a so as to move the focus lens 10a with the fine pitch (fine movement amount).

At step S961, the camera controller 40 performs the minute drive of the focus lens 10a to the infinitely-far side, and sequentially acquires the contrast AF data at each minute drive pitch. The camera controller 40 detects, with the acquisition of the contrast AF data, the position of the focus lens 10a through the lens status detector 12.

Next, at step S962, the camera controller 40 determines, by using the contrast AF data acquired at step S961, whether or not detection of the contrast in-focus position is possible. Since the contrast AF decides a focus lens position (peak position) at which the contrast evaluation value becomes maximum as the contrast in-focus position, it is necessary for detecting the peak position that the contrast evaluation value once decrease after becoming maximum.

Thus, the camera controller 40 at this step determines that the detection of the contrast in-focus position is possible when the contrast evaluation value decreases after becoming maximum, and then proceeds to step S965 to stop the movement of the focus lens 10a. On the other hand, the camera controller 40 determines that the detection of the contrast in-focus position is not yet possible when the contrast evaluation value does not yet decrease after becoming maximum (that is, keeps increasing), and then proceeds to step S963.

At step S963, the camera controller 40 determines presence or absence of abnormality in the contrast AF. For example, the camera controller 40 determines presence of the abnormality when the acquisition of the contrast AF data is difficult because of the low contrast object. In response to the determination of such abnormality, the camera controller 40 proceeds to step S964 to display a warning on the back-face monitor 43. Thereafter, the camera controller 40 returns to step S902 shown in FIG. 12 to cause the user to look for an object enabling normal acquisition of the contrast AF data, and performs the object selection process over again. The camera controller 40 determining absence of the abnormality returns to step S961 to perform the minute drive of the focus lens 10a in order to continuously acquire the contrast AF data.

Next, at step S966, the camera controller 40 calculates a contrast in-focus position C by using the contrast AF data acquired at step S961; specifically, by using the contrast AF data acquired before and after the maximum (peak) of the evaluation value. Since at step S961 the above-described backlash removal drive has been performed in the phase difference AF data acquisition process performed at step S903, error components are excluded from the contrast AF data acquired at step S961.

At step S967, the camera controller 40 calculates a contrast defocus amount C-DEF by converting difference from the contrast in-focus position C to a current focus lens position into a defocus amount. The contrast defocus amount C-DEF is calculated by a same method as that described at step 408 shown in FIG. 4 in Embodiment 1. After the calculation of the contrast defocus amount C-DEF, the camera controller 40 proceeds to step S905 shown in FIG. 12 to calculate the AF correction value.

Figure 16:
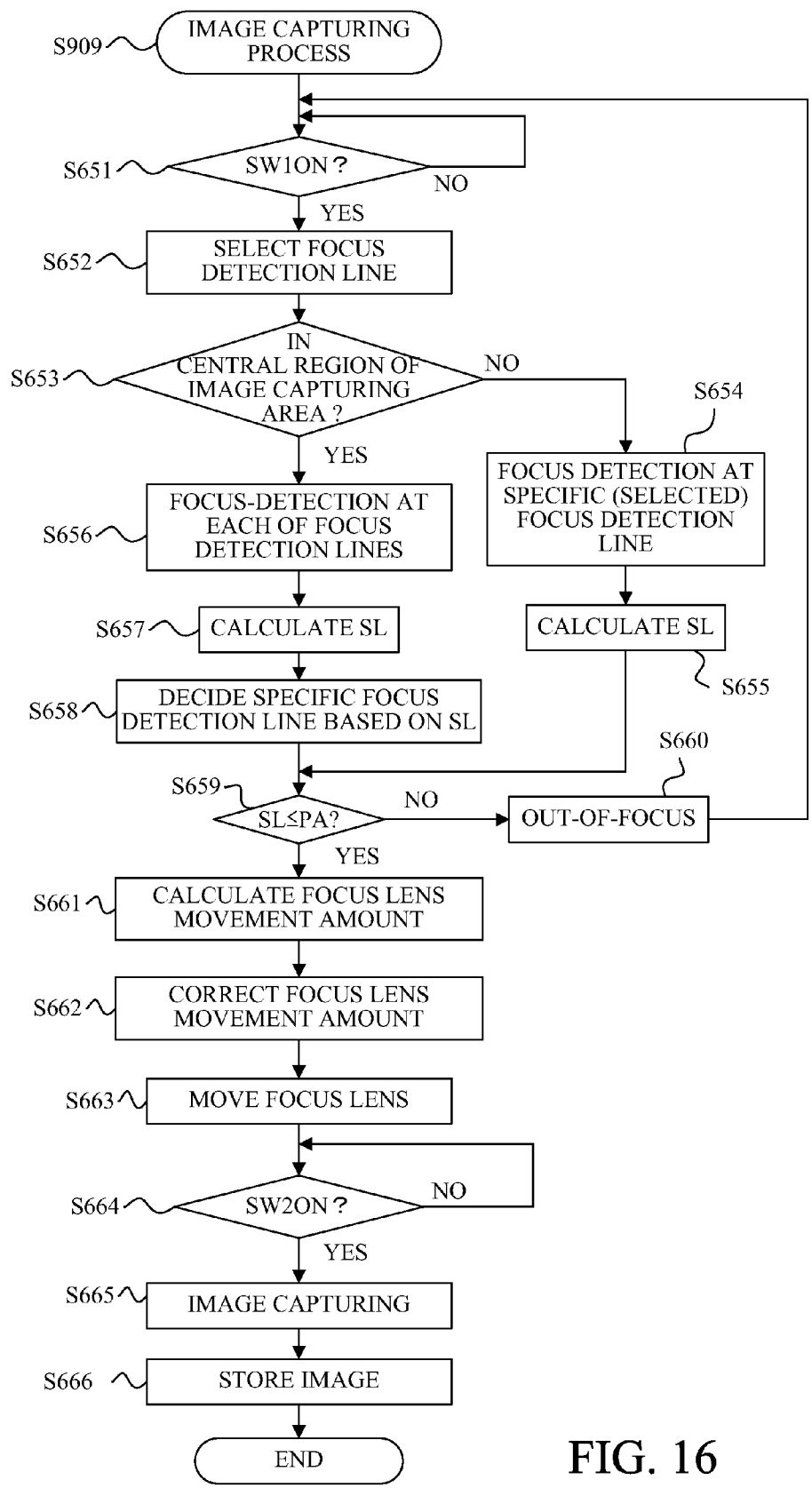
FIG. 16 is a flowchart showing an image capturing process of the camera of Embodiment 3.

FIG. 16 is a flowchart showing the image capturing process performed at step S909 shown in FIG. 12.

At step S651, the camera controller 40 determines whether or not the first switch (SW1) has been turned on by the half-press operation of the release switch (not shown). If the first switch (SW1) has not been turned on, the camera controller 40 waits for the turning-on thereof. If the first switch (SW1) has been turned on, the camera controller 40 proceeds to step S652.

At step S652, the camera controller 40 selects one focus detection line from the 21 focus detection lines provided in the image capturing area, according to a selection operation by the user or a predetermined algorithm.

Next, at step S653, the camera controller 40 determines whether or not the focus detection line selected at step S652 is one of the focus detection lines L1-L4 and L19 included in the central region of the image capturing area. If the selected focus detection line is not one of the focus detection lines in the central region, the camera controller 40 proceeds to step S654. If the selected focus detection line is one of the focus detection lines in the central region, the camera controller 40 proceeds to step S656.

At step S654, the camera controller 40 takes in the paired image signals from the paired light-receiving element rows, which correspond to the selected focus detection line, on the area sensor of the AF sensor 22, and calculates the phase difference of the paired image signals, and then calculates the defocus amount DEF from the phase difference. The camera controller 40 decides the selected focus detection line as a specific focus detection line. Then, the camera controller 40 proceeds to step S655.

At step S655, the camera controller 40 calculates, from the paired image signal taken in at step S654 from the specific focus detection line, the coincidence degree U, the correlation change amount ΔV, the sharpness SH and the light and dark ratio PBD thereof. In addition, the camera controller 40 calculates the S-level value SL by using these four parameter values. Then, the camera controller 40 proceeds to step S656.

At step S656, the camera controller 40 takes in the paired image signals from the paired light-receiving element rows, which correspond to each of the focus detection lines included in the central region of the image capturing area on the area sensor, and calculates the phase difference of the paired image signals for each focus detection line, and then calculates the defocus amount DEF from the phase difference for each focus detection line. Then, the camera controller 40 proceeds to step S657.

At step S657, the camera controller 40 calculates, from the paired image signal taken in at step S656 from each focus detection line, the coincidence degree U, the correlation change amount ΔV, the sharpness SH and the light and dark ratio PBD thereof. In addition, the camera controller 40 calculates the S-level value SL by using these four parameter values for each focus detection line.

Next, at step S658, the camera controller 40 decides, as a specific focus detection line, one focus detection line from which a smallest one of the S-level values SL calculated for the focus detection lines included in the central region of the image capturing area is acquired. Then, the camera controller 40 proceeds to step S659.

At step S659, the camera controller 40 determines whether or not the S-level value SL is equal to or less than a threshold PA. If the S-level value SL is equal to or less than the threshold PA, the camera controller 40 determines that reliability level of the phase difference AF data acquired at steps S654 and S656 is high (third level) to perform in-focus drive of the focus lens 10a for the object by using the defocus amount DEF calculated at these steps. If the S-level value SL is larger than the threshold PA, the camera controller 40 determines that reliability level of the phase difference AF data acquired at steps S654 and S656 is low (fourth level) to proceed to step S660. At step S660, the camera controller 40 displays a warning showing an out-of-focus state.

The threshold PA used in the image capturing process and the threshold A used in the phase difference AF data acquisition process during the AF calibration (not in the image capturing process) have the following relationship:

$$PA > A$$

That is, the threshold A used in the phase difference AF data acquisition process during the AF calibration is lower than the threshold PA used in the image capturing process, which means that a severer threshold A than the threshold PA is provided for the AF calibration. In other words, the reliability level (first level) required for the AF calibration is set to be higher than the reliability level (third level) required for the image capturing process. This is to enable calculation of the AF correction value with higher accuracy by providing a severer threshold for the AF calibration than that for the image capturing process since the AF correction value used for the AF calibration requires higher accuracy.

At step S661, the camera controller 40 calculates a movement amount (including a movement direction) of the focus lens 10a necessary to acquire an in-focus state, from the defocus amount at the specific focus detection line. Specifically, the camera controller 40 calculates a number of driving pulses of the actuator in the lens driver 11 moving the focus lens 10a. The calculation of the movement amount of the focus lens 10a corresponds to calculation of the phase difference in-focus position.

Next, at step S662, the camera controller 40 corrects the movement amount of the focus lens 10a calculated at step S661 by adding the AF correction value acquired by the AF calibration to (or by subtracting the AF correction value from) the movement amount. The correction of the movement amount of the focus lens 10a corresponds to correction of the phase difference in-focus position. When the AF correction value is not produced, since the AF correction value is 0, the camera controller 40 does not perform the correction of the movement amount of the focus lens 10a (that is, the correction of the phase difference in-focus position).

Then, at step S663, the camera controller 40 sends a focus instruction to the lens controller 13 such that the focus lens 10a is moved by the corrected movement amount. In response thereto, the lens controller 13 moves the focus lens 10a to the corrected phase difference in-focus position through the lens driver 11.

Next, at step S664, the camera controller 40 determines whether or not the second switch (SW2) has been turned on by the full-press operation of the release switch. If the second switch (SW2) has not been turned on, the camera controller 40 waits for the turning-on thereof. If the second switch (SW2) has been turned on, the camera controller 40 proceeds to step S665.

At step S665, the camera controller 40 performs image capturing to produce a recording image.

Next, at step S666, the camera controller 40 stores the recording image produced at step S665 to the camera memory 42.

This embodiment also may prestore, in the interchangeable lens 1, the information on the difference between the detection results of the contrast in-focus positions in the case of moving the focus lens 10a from the close side to the infinitely-far side and in the case of moving the focus lens 10a from the infinitely-far side to the close side. Moreover, this embodiment also may perform the AF calibration for each of the focus lens movement directions to store the AF correction values for the respective focus lens movement directions to the camera memory 42.

As described above, this embodiment determines the reliability level of the phase difference AF (that is, of the phase difference AF data) for the object by using the S-level value SL, which can avoid the AF calibration from being performed for an object improper for the phase difference AF. Therefore, this embodiment can perform efficient AF calibration in a short time. Moreover, this embodiment sets a severer threshold for the reliability level determination in the AF calibration than that in the image capturing process, which makes it possible to calculate the AF correction value with higher accuracy for the AF calibration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-116739, filed on May 25, 2011, and 2012-109554, filed on May, 11, 2012 which are hereby incorporated by reference herein in their entirety.

What is claimed is:

1. An image pickup apparatus comprising:
   an image capturing part configured to photoelectrically convert an object image formed by an image pickup optical system to produce an image pickup signal;
   a first detector configured to detect a first in-focus position by a phase difference detection method using paired image signals produced by photoelectric conversion of the object image;
   a controller configured to control position of a focus lens included in the image pickup optical system on a basis of the first in-focus position to perform focusing;
   a second detector configured to detect a second in-focus position by a contrast detection method using the image pickup signal;
   a calculating part configured to calculate a correction value for correcting the first in-focus position in image capturing on a basis of difference between the first in-focus position and the second in-focus position; and
   a determining part configured to determine a level of reliability of the first in-focus position, using information on the paired image signals,
   wherein the controller is configured to calculate the correction value when the level of reliability is a first level, and to restrict the calculation of the correction value when the level of reliability is a second level lower than the first level.

2. An image pickup apparatus according to claim 1, wherein the information on the paired image signals includes at least one of a degree of coincidence of the paired image signals, a correlation change amount thereof, sharpness thereof and a light and dark ratio thereof.

3. An image pickup apparatus according to claim 1, wherein the information on the paired image signals includes a photoelectric conversion time for which the paired image signals are produced by the photoelectric conversion of the object image.

4. An image pickup apparatus according to claim 1, wherein the controller is configured to cause the first detector to produce the paired image signals plural number of times,
   wherein the determining part is configured to calculate a mean value of the levels of reliability acquired by using the information on the paired image signals produced the plural number of times, respectively, and
   wherein the calculating part is configured to calculate the correction value when the mean value is the first level, and to restrict the calculation of the correction value when the mean value is the second level.

5. An image pickup apparatus according to claim 1,
   wherein, in the image capturing, the controller is configured to perform the focusing when the level of reliability is a third level, and to restrict the focusing when the level of reliability is lower than the third level, and
   wherein thresholds for the first and second levels are higher than those for the third and fourth levels.

6. An image pickup apparatus according to claim 1, further comprising:
   a driving mechanism configured to move the focus lens,
   wherein the controller is configured to cause the determining part and the calculating part to determine the level of reliability and calculate the correction value, after causing the driving mechanism to perform an error reduction operation for reducing a correction error due to backlash included in the driving mechanism.

7. An image pickup apparatus according to claim 1,
   wherein the calculating part is configured to calculate a first correction value using the second in-focus position acquired by moving the focus lens in a first direction and to calculate a second correction value using the second in-focus position acquired by moving the focus lens in a second direction different from the first direction, the first and second correction values being stored in a memory, and
   wherein the controller is configured to correct the first in-focus position by using one of the first and second correction values depending on a moving direction of the focus lens in the focusing for the image capturing.

8. An image pickup apparatus according to claim 1,
   wherein the calculating part is configured to calculate difference between the second in-focus position acquired by moving the focus lens in a first direction and the second in-focus position acquired by moving the focus lens in a second direction different from the first direction, information on the difference being stored in a memory, and
   wherein the controller is configured to correct the first in-focus position by using the correction value and the information on the difference, depending on the moving direction of the focus lens in the focusing for the image capturing.

9. A method of controlling an image pickup apparatus configured to electrically convert an object image formed by an image pickup optical system to produce an image pickup signal, the method comprising:
   a step of detecting a first in-focus position by a phase difference detection method using paired image signals produced by photoelectric conversion of the object image;
   a step of controlling position of a focus lens included in the image pickup optical system on a basis of the first in-focus position to perform focusing;

a step of detecting a second in-focus position by a contrast detection method using the image pickup signal;

a calculation step of calculating a correction value for correcting the first in-focus position in image capturing on a basis of difference between the first in-focus position and the second in-focus position; and a step of determining a level of reliability of the first in-focus position, using information on the paired image signals, wherein, in the calculation step, the method calculates the correction value when the level of reliability is a first level, and restricts the calculation of the correction value when the level of reliability is a second level lower than the first level.

10. An image pickup apparatus comprising:

an image capturing part configured to photoelectrically convert an object image formed by an image pickup optical system to produce an image pickup signal;

a first detector configured to detect a first in-focus position by a phase difference detection method using paired image signals produced by photoelectric conversion of the object image;

a controller configured to control position of a focus lens included in the image pickup optical system on a basis of the first in-focus position to perform focusing;

a second detector configured to detect a second in-focus position by a contrast detection method using the image pickup signal;

a calculating part configured to calculate a correction value for correcting the first in-focus position in image capturing on a basis of difference between the first in-focus position and the second in-focus position; and a determining part configured to determine a level of reliability of the first in-focus position, using information on the paired image signals, wherein the controller is configured to determine, on the basis of the level of reliability, whether or not to restrict calculation of the correction value.

11. An image pickup apparatus comprising:

an image capturing part configured to photoelectrically convert an object image formed by an image pickup optical system to produce an image pickup signal;

a first detector configured to detect a first in-focus position by a phase difference detection method using paired image signals produced by photoelectric conversion of the object image;

a controller configured to control position of a focus lens included in the image pickup optical system on a basis of the first in-focus position to perform focusing;

a second detector configured to detect a second in-focus position by a contrast detection method using the image pickup signal;

a calculating part configured to calculate a correction value for correcting the first in-focus position in image capturing on a basis of difference between the first in-focus position and the second in-focus position; and a determining part configured to determine a level of reliability of the first in-focus position, using information on the paired image signals, wherein the controller is configured to restrict the calculation of the correction value when the level of reliability is lower than a predetermined level, and to calculate the correction value when the level of reliability is not lower than the predetermined level.

12. A method of controlling an image pickup apparatus configured to electrically convert an object image formed by an image pickup optical system to produce an image pickup signal, the method comprising:

a step of detecting a first in-focus position by a phase difference detection method using paired image signals produced by photoelectric conversion of the object image;

a step of controlling position of a focus lens included in the image pickup optical system on a basis of the first in-focus position to perform focusing;

a step of detecting a second in-focus position by a contrast detection method using the image pickup signal;

a calculation step of calculating a correction value for correcting the first in-focus position in image capturing on a basis of difference between the first in-focus position and the second in-focus position; and a step of determining a level of reliability of the first in-focus position, using information on the paired image signals, wherein the method determines, on the basis of the level of reliability, whether or not to restrict calculation of the correction value.

13. A method of controlling an image pickup apparatus configured to electrically convert an object image formed by an image pickup optical system to produce an image pickup signal, the method comprising:

a step of detecting a first in-focus position by a phase difference detection method using paired image signals produced by photoelectric conversion of the object image;

a step of controlling position of a focus lens included in the image pickup optical system on a basis of the first in-focus position to perform focusing;

a step of detecting a second in-focus position by a contrast detection method using the image pickup signal;

a calculation step of calculating a correction value for correcting the first in-focus position in image capturing on a basis of difference between the first in-focus position and the second in-focus position; and a step of determining a level of reliability of the first in-focus position, using information on the paired image signals, wherein, in the calculation step, the method restricts the calculation of the correction value when the level of reliability is lower than a predetermined level, and calculates the correction value when the level of reliability is not lower than the predetermined level.

* * * * *